US 011794179B2

(12) United States Patent
Johns

(10) Patent No.: US 11,794,179 B2
(45) Date of Patent: Oct. 24, 2023

(54) SYNTHESIS AND CHARACTERIZATION OF METATHESIS CATALYSTS

(71) Applicant: Umicore AG & Co. KG, Hanau-Wolfgang (DE)

(72) Inventor: Adam M. Johns, Claremont, CA (US)

(73) Assignee: UMICORE AG & CO. KG

( * ) Notice: Subject to any disclaimer, the term of this patent is extended or adjusted under 35 U.S.C. 154(b) by 0 days.

(21) Appl. No.: 17/358,718

(22) Filed: Jun. 25, 2021

(65) Prior Publication Data

US 2022/0379292 A1  Dec. 1, 2022

Related U.S. Application Data

(62) Division of application No. 16/327,566, filed as application No. PCT/US2017/046283 on Aug. 10, 2017, now Pat. No. 11,065,609.

(60) Provisional application No. 62/378,791, filed on Aug. 24, 2016.

(51) Int. Cl.
*B01J 31/22* (2006.01)
*C07F 15/00* (2006.01)
*B01J 31/18* (2006.01)
*B01J 31/24* (2006.01)

(52) U.S. Cl.
CPC ......... *B01J 31/2278* (2013.01); *B01J 31/181* (2013.01); *B01J 31/1875* (2013.01); *B01J 31/226* (2013.01); *B01J 31/2208* (2013.01); *B01J 31/2273* (2013.01); *B01J 31/2404* (2013.01); *C07F 15/0046* (2013.01); *B01J 2231/14* (2013.01); *B01J 2231/543* (2013.01);
(Continued)

(58) Field of Classification Search
None
See application file for complete search history.

(56) References Cited

U.S. PATENT DOCUMENTS

| 5,912,376 A | 6/1999 | Van Der Schaaf et al. |
| 7,294,717 B2 | 11/2007 | Herrmann et al. |
| 8,569,560 B2 | 10/2013 | Schrodi et al. |

(Continued)

FOREIGN PATENT DOCUMENTS

| CN | 1373756 A | 10/2002 |
| CN | 102123979 A | 7/2011 |

(Continued)

OTHER PUBLICATIONS

Adlhart, C., et al., "Mechanism and Activity of Ruthenium Olefin Metathesis Catalysts: The Role of Ligands and Substrates from a theoretical Perspective", J. Am. Chem. Soc., 2004, vol. 126, pp. 3496-3510.

(Continued)

*Primary Examiner* — Yun Qian
(74) *Attorney, Agent, or Firm* — Faegre Drinker Biddle & Reath LLP

(57) ABSTRACT

This invention relates generally to olefin metathesis catalysts, to the preparation of such compounds, compositions comprising such compounds, methods of using such compounds, and the use of such compounds in the metathesis of olefins and in the synthesis of related olefin metathesis catalysts. The invention has utility in the fields of catalysis, organic synthesis, polymer chemistry, and in industrial applications such as oil and gas, fine chemicals and pharmaceuticals.

3 Claims, 3 Drawing Sheets

(52) U.S. Cl.
CPC ...... *B01J 2531/821* (2013.01); *B01J 2540/30* (2013.01)

(56) References Cited

U.S. PATENT DOCUMENTS

| | | | | |
|---|---|---|---|---|
| 2003/0100776 | A1* | 5/2003 | Grubbs | C07F 9/4015 558/207 |
| 2004/0188906 | A1 | 9/2004 | Gunnarsson | |
| 2005/0014916 | A1 | 1/2005 | Sakamoto et al. | |
| 2010/0145086 | A1 | 6/2010 | Schrodi et al. | |
| 2012/0309998 | A1 | 12/2012 | Holtcamp et al. | |
| 2013/0165649 | A1 | 6/2013 | Cazin | |
| 2014/0309433 | A1 | 10/2014 | Marx et al. | |
| 2014/0329017 | A1 | 11/2014 | Stephen et al. | |
| 2014/0371454 | A1 | 12/2014 | Hoveyda et al. | |
| 2016/0014916 | A1 | 1/2016 | Ausserlechner et al. | |
| 2016/0185684 | A1 | 6/2016 | Hartung et al. | |

FOREIGN PATENT DOCUMENTS

| | | |
|---|---|---|
| EP | 3008078 A1 | 4/2016 |
| EP | 3386936 A1 | 10/2018 |
| JP | 10-180114 A | 7/1998 |
| JP | 2003-500412 A | 1/2003 |
| JP | 2019-526439 A | 9/2019 |
| WO | 00/71554 A2 | 11/2000 |
| WO | 2002/100590 A1 | 12/2002 |
| WO | 2014/201300 A1 | 12/2014 |
| WO | 2017/100585 A1 | 6/2017 |
| WO | 2017/153455 A1 | 9/2017 |
| WO | 2018/038928 A1 | 3/2018 |

OTHER PUBLICATIONS

Alessio Enzo, "Synthesis and Reactivity of Ru-, Os-, Rh-, and Ir-Halide-Sulfoxide Complexes†", Chem. Rev., vol. 104, 2004, pp. 4203-4242.

Buhl, H., et al., "Investigations on the lability of CO in (NHC) Rh (CO)2Cl complexes", Journal of Organometallic Chemistry, 2016, vol. 809, pp. 74-78.

Calligaris et al., "Structure and bonding in metal sulfoxide complexes", Coordination Chemistry Reviews, vol. 153, Aug. 1996, pp. 83-154.

Evans et al., "Dichlorotetrakis(dimethyl sulphoxide)ruthenium(II) and its use as a source material for some new ruthenium(II) complexes", J. Chem. Soc., Dalton Trans., 1973, pp. 204-209.

International Preliminary Report on Patentability received for PCT Patent Application No. PCT/US2017/046283, dated Mar. 7, 2019, 7 pages.

International Search Report for PCT/US2017/046283 dated Dec. 8, 2017.

Mikus et al., "Pentacoordinate Ruthenium(II) Catecholthiolate and Mercaptophenolate Catalysts for Olefin Metathesis: Anionic Ligand Exchange and Ease of Initiation", Organometallics, vol. 35, 22, 2016, pp. 3878-3892.

Sanford, M., et al., "A Versatile Precursor for the Synthesis of New Ruthenium Olefin Metathesis Catalysts", Organometallics, 2001, vol. 20, No. 25, Jan. 12, 2001, pp. 5314-5318.

Santana et al., "DMSO Molecule as Ancillary Ligand in Ru-Based Catalysts for Ring Opening Metathesis Polymerization", J. Braz. Chem. Soc., vol. 21, No. 2, 2010, pp. S1-S6.

Santana et al., "DMSO Molecule as Ancillary Ligand in Ru-Based Catalysts for Ring Opening Metathesis Polymerization", J. Braz. Chem. Soc., vol. 21, No. 2, 2010, pp. 279-287.

Szadkowska et al., "Ruthenium Olefin Metathesis Initiators Bearing Chelating Sulfoxide Ligands", Organometallics, vol. 28, 2009, pp. 2693-2700.

Szadkowska, "Ruthenium Olefin Metathesis Catalysts Containing Six-Membered Sulfone and Sulfonamide Chelating Rings", Organometallics 2011, 30, 5, 1130-1138.

Velders et al., "Synthesis and Chemical-Pharmacological Characterization of the Antimetastatic NAMI-A-Type Ru(III) Complexes (Hdmtp)[imws-RuCl4(dmso-S)(dmtp)], (Na)[fmns-RuCl4(dmso-S)(dmtp)], and[mer-RuCl3(H20)(dmso-S)(dmtp)] (dmtp =5,7-Dimethyl[1,2,4]triazolo[1,5-a]pyrimidine)", J. Med. Chem., vol. 47, 2004, pp. 1110-1121.

Written Opinion of the International Searching Authority for PCT/US2017/046283 dated Dec. 8, 2017.

Alessio et al., "Cis- and trans-dihalotetrakis(dimethyl sulfoxide)ruthenium(II) complexes (RuX2(DMSO)4; X = Cl, Br); synthesis, structure, and antitumor activity," Inorganic Chemistry, vol. 27, No. 23, Nov. 1, 1988, pp. 4099-4106.

\* cited by examiner

SYNTHESIS AND CHARACTERIZATION OF METATHESIS CATALYSTS

CROSS-REFERENCE TO RELATED APPLICATIONS

This application is a division application of U.S. Ser. No. 16/327,566, filed Feb. 22, 2019, which is a national stage application (under 35 U.S.C. § 371) of PCT/US2017/046283, filed Aug. 10, 2017, which claims benefit of U.S. Application No. 62/378,791, filed Aug. 24, 2016, all of which are incorporated herein by reference in their entirety.

TECHNICAL FIELD

This invention relates generally to olefin metathesis catalysts, to the preparation of such compounds, compositions comprising such compounds, methods of using such compounds, and the use of such compounds in the metathesis of olefins and in the synthesis of related olefin metathesis catalysts. The invention has utility in the fields of catalysis, organic synthesis, polymer chemistry, and in industrial applications such as oil and gas, fine chemicals and pharmaceuticals.

BACKGROUND

Since its discovery in the 1950s, olefin metathesis has emerged as a valuable synthetic method for the formation of carbon-carbon double bonds. Recent advances in applications to organic syntheses and polymer syntheses mostly rely on developments of well-defined olefin metathesis catalysts.

The technology of ruthenium metathesis catalysts has enabled the development of several research platforms including: ring opening metathesis polymerization (ROMP), ring opening cross metathesis (ROCM), cross metathesis (CM), ring closing metathesis (RCM).

First Generation Grubbs ruthenium olefin metathesis catalysts, such as: $(PCy_3)_2(Cl)_2Ru=CHPh$, have been largely used in organic synthesis.

The incorporation of certain types of N-Heterocyclic Carbene (NHC) ligands played an essential role in the development of ruthenium metathesis catalysts, giving rise to the Second Generation Grubbs ruthenium olefin metathesis catalysts, such as: $(IMesH_2)(PCy_3)(Cl)_2Ru=CHPh$, where $IMesH_2$ is 1,3-dimesityl-4,5-dihydroimidazol-2-ylidene.

In order to exchange the phosphine on the Second Generation Grubbs ruthenium olefin metathesis catalysts, the Grubbs group reported in 2001 (*Organometallics* 2001, 20, 5314-5318) a method involving a precursor bearing two pyridine ligands: $(IMesH_2)(Cl)_2(C_5H_5N)_2Ru=CHPh$. The labile pyridine ligands have allowed the preparation of diverse ruthenium olefin metathesis catalysts. However, the preparation of pyridine complexes, requires large quantities of expensive and malodorous reagents (pyridine), and difficult reaction conditions (negative ° C. temperatures) especially for industrial scale-up.

Therefore there is an ongoing need for efficient, high yield, high purity and ease in scaling up procedures for the synthesis of olefin metathesis catalysts, particularly Second Generation Grubbs ruthenium olefin metathesis catalysts.

SUMMARY OF THE INVENTION

To meet this need the inventors have discovered novel ruthenium olefin metathesis catalysts, bearing a sulfoxide ligand as described herein. The ruthenium olefin metathesis catalysts bearing sulfoxide labile ligands exhibit high stability and allow the ready synthesis of various Second Generation Grubbs ruthenium olefin metathesis catalysts in higher yield and with higher purity, compared to the existing procedures.

In one embodiment, the invention provides an olefin metathesis catalyst, represented by the structure of Formula (I)

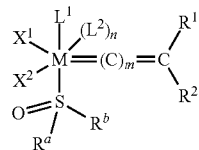

Formula (I)

wherein:
M is a Group 8 transition metal; generally M is ruthenium or osmium; typically M is ruthenium;
$L^1$ and $L^2$ are independently neutral electron donor ligands;
n is 0 or 1; typically n is 0;
m is 0, 1 or 2; typically m is 0;
$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;
$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group [—S(O)—];
$X^1$ and $X^2$ are independently anionic ligands; generally, $X^1$ and $X^2$ are independently halogen, trifluoroacetate, perfluorophenols or nitrate; typically, $X^1$ and $X^2$ are independently Cl, Br, I or F;
$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene.

In one embodiment, the invention provides a method of synthesizing the olefin metathesis catalysts of the invention.

In one embodiment, the invention provides a method of using the olefin metathesis catalysts of the invention in metathesis reactions.

In one embodiment, the invention provides a method of synthesizing a Second Generation Grubbs catalyst, using an olefin metathesis catalyst of the invention.

Other embodiments of the invention are described herein.

These and other aspects of the present invention will be apparent to one of skill in the art, in light of the following detailed description and examples. Furthermore, it is to be

DETAILED DESCRIPTION

Figure 1:
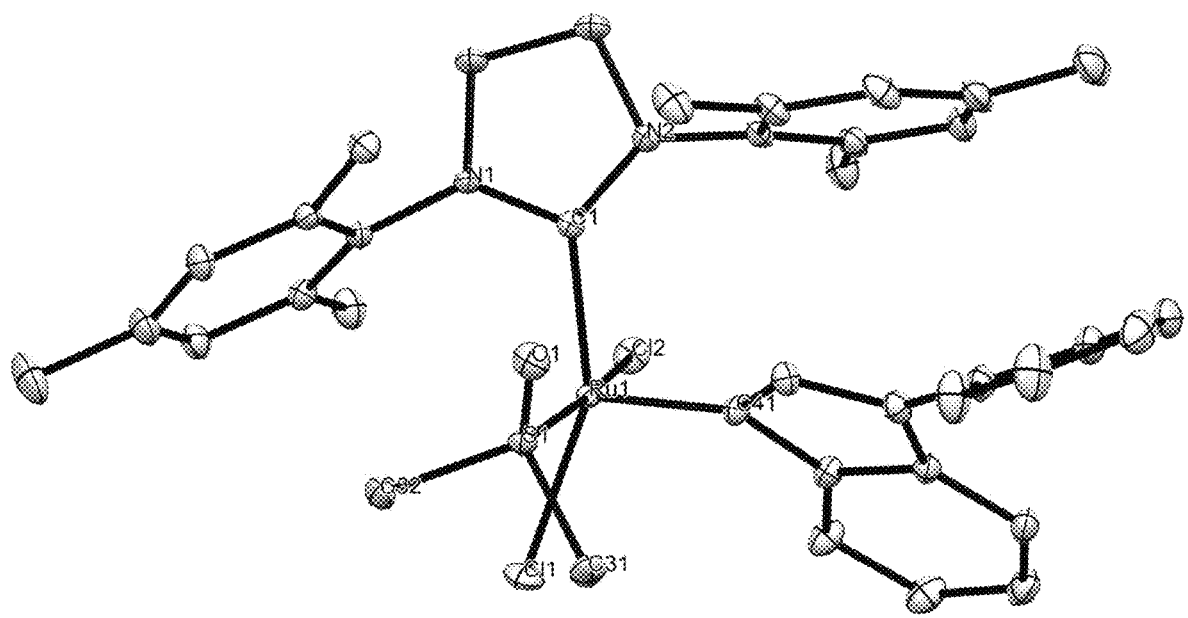
FIG. 1. Oak Ridge Thermal Ellipsoid Plot (ORTEP) diagram of C747.

Unless otherwise indicated, the invention is not limited to specific reactants, substituents, catalysts, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an olefin" includes a single olefin as well as a combination or mixture of two or more olefins, reference to "a substituent" encompasses a single substituent as well as two or more substituents, and the like.

As used in the specification and the appended claims, the terms "for example", "for instance", "such as", or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to 30 carbon atoms, generally containing 1 to 24 carbon atoms, typically 1 to 12 carbon atoms, such as methyl, ethyl, n-propyl, iso-propyl, n-butyl, iso-butyl, t-butyl, octyl, decyl, and the like, as well as cycloalkyl groups such as cyclopentyl, cyclohexyl and the like. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a divalent linear, branched, or cyclic alkyl group, where "alkyl" is as defined herein.

The term "alkenyl" as used herein refers to a linear, branched, or cyclic hydrocarbon group of 2 to 30 carbon atoms containing at least one double bond, such as ethenyl, n-propenyl, iso-propenyl, n-butenyl, iso-butenyl, octenyl, decenyl, tetradecenyl, hexadecenyl, eicosenyl, tetracosenyl, and the like. Generally "alkenyl" groups herein contain 2 to 24 carbon atoms, typically "alkenyl" groups herein contain 2 to 12 carbon atoms. The term "lower alkenyl" intends an "alkenyl" group of 2 to 6 carbon atoms, and the specific term "cycloalkenyl" intends a cyclic "alkenyl" group, typically having 5 to 8 carbon atoms. The term "substituted alkenyl" refers to "alkenyl" substituted with one or more substituent groups, and the terms "heteroatom-containing alkenyl" and "heteroalkenyl" refer to "alkenyl" in which at least one carbon atom is replaced with a heteroatom. If not otherwise indicated, the terms "alkenyl" and "lower alkenyl" include linear, branched, cyclic, unsubstituted, substituted, and/or heteroatom-containing "alkenyl" and lower "alkenyl", respectively. The term "alkenyl" is used interchangeably with the term "olefin" herein.

The term "alkenylene" as used herein refers to a divalent linear, branched, or cyclic alkenyl group, where "alkenyl" is as defined herein.

The term "alkynyl" as used herein refers to a linear or branched hydrocarbon group of 2 to 30 carbon atoms containing at least one triple bond, such as ethynyl, n-propynyl, and the like. Generally "alkynyl" groups herein contain 2 to 24 carbon atoms; typical "alkynyl" groups described herein contain 2 to 12 carbon atoms. The term "lower alkynyl" intends an "alkynyl" group of 2 to 6 carbon atoms. The term "substituted alkynyl" refers to "alkynyl" substituted with one or more substituent groups, and the terms "heteroatom-containing alkynyl" and "heteroalkynyl" refer to "alkynyl" in which at least one carbon atom is replaced with a heteroatom. If not otherwise indicated, the terms "alkynyl" and "lower alkynyl" include linear, branched, unsubstituted, substituted, and/or heteroatom-containing "alkynyl" and lower "alkynyl" respectively.

The term "alkoxy" as used herein intends an alkyl group bound through a single, terminal ether linkage; that is, an "alkoxy" group can be represented as —O-alkyl where alkyl is as defined herein. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). "Aryl" groups contain 5 to 30 carbon atoms, generally "aryl" groups contain 5 to 20 carbon atoms; and typically "aryl" groups contain 5 to 14 carbon atoms. Exemplary "aryl" groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups; for example 2,4,6-trimethylphenyl (i.e., mesityl or Mes), 2-methyl-phenyl, 2,6-di-iso-propylphenyl (i.e., DIPP or DiPP), 2-isopropyl-phenyl (i.e., IPP, Ipp or ipp), 2-isopropyl-6-methylphenyl (i.e., MIPP or Mipp or MiPP). The terms "heteroatom-containing aryl" and "heteroaryl" refer to "aryl" substituents in which at least one carbon atom is replaced with a heteroatom, as will be described in further detail infra.

The term "aryloxy" as used herein refers to an aryl group bound through a single, terminal ether linkage, wherein "aryl" is as defined herein. An "aryloxy" group can be represented as —O-aryl where aryl is as defined herein. Preferred "aryloxy" groups contain 5 to 24 carbon atoms, and particularly preferred "aryloxy" groups contain 5 to 14 carbon atoms. Examples of "aryloxy" groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined herein. "Alkaryl" and "aralkyl" groups contain 6 to 30 carbon atoms; generally "alkaryl" and "aralkyl" groups contain 6 to 20 carbon atoms; and typically "alkaryl" and "aralkyl" groups contain 6 to 16 carbon atoms. "Alkaryl" groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of "aralkyl" groups include, without limitation, benzyl, 2-phenyl-ethyl, 3-phenyl-propyl, 4-phenylbutyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is "alkaryl" or "aralkyl", respectively, as defined herein.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined herein.

The terms "cyclic" and "ring" refer to alicyclic or aromatic groups that may or may not be substituted and/or heteroatom containing, and that can be monocyclic, bicyclic, or polycyclic. The term "alicyclic" is used in the conventional sense to refer to an aliphatic cyclic moiety, as opposed to an aromatic cyclic moiety, and can be monocyclic, bicyclic, or polycyclic.

The terms "halo", "halogen" and "halide" are used in the conventional sense to refer to a chloro, bromo, fluoro, or iodo substituent.

The term "hydrocarbyl" refers to univalent "hydrocarbyl" moieties containing 1 to 30 carbon atoms, typically containing 1 to 24 carbon atoms, specifically containing 1 to 12 carbon atoms, including linear, branched, cyclic, saturated, and unsaturated species, such as alkyl groups, alkenyl groups, aryl groups, and the like. The term "lower hydrocarbyl" intends a "hydrocarbyl" group of 1 to 6 carbon atoms, typically 1 to 4 carbon atoms, and the term "hydrocarbylene" intends a divalent "hydrocarbyl" moiety containing 1 to 30 carbon atoms, typically 1 to 24 carbon atoms, specifically 1 to 12 carbon atoms, including linear, branched, cyclic, saturated and unsaturated species. The term "lower hydrocarbylene" intends a "hydrocarbylene" group of 1 to 6 carbon atoms. "Substituted hydrocarbyl" refers to "hydrocarbyl" substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to "hydrocarbylene" substituted with one or more substituent groups, and the terms "heteroatom-containing hydrocarbylene" and heterohydrocarbylene" refer to "hydrocarbylene" in which at least one carbon atom is replaced with a heteroatom. Unless otherwise indicated, the term "hydrocarbyl" and "hydrocarbylene" are to be interpreted as including substituted and/or heteroatom-containing "hydrocarbyl" and "hydrocarbylene" moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" can be monocyclic, bicyclic, or polycyclic as described herein with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—(CO)—X where X is halo), $C_2$-$C_{24}$ alkylcarbonato (—O—(CO)—O-alkyl), $C_6$-$C_{24}$ arylcarbonato (—O—(CO)—O-aryl), carboxyl (—COOH), carboxylato (—COO$^-$), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), carbamido (—NH—(CO)—NH$_2$), cyano (—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, ($C_1$-$C_{24}$ alkyl)($C_5$-$C_{24}$ aryl)-substituted amino, ($C_2$-$C_{24}$ alkyl)-amido (—NH—(CO)-alkyl), ($C_6$-$C_{24}$ aryl)-amido (—NH—(CO)-aryl), imino (—CR═NH where R is hydrogen, $C_1$-$C_{24}$ alkyl, $C_5$-$C_{24}$ aryl, $C_6$-$C_{24}$ alkaryl, $C_6$-$C_{24}$ aralkyl, etc.), ($C_2$-$C_{20}$ alkyl)-imino (—CR═N(alkyl), where R is hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR═N(aryl), where R is hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O$^-$), ($C_1$-$C_{24}$ alkyl)-sulfanyl (—S-alkyl; also termed "alkylthio"), ($C_5$-$C_{24}$ aryl)-sulfanyl (—S-aryl; also termed "arylthio"), ($C_1$-$C_{24}$ alkyl)-sulfinyl (—(SO)- alkyl), (C$_5$-C$_{24}$ aryl)-sulfinyl (—(SO)-aryl), (C$_1$-C$_{24}$ alkyl)-sulfonyl (—SO$_2$-alkyl),mono-(C$_1$-C$_{24}$ alkyl)-amino sulfonyl —SO$_2$—N(H)alkyl), di-(C$_1$-C$_{24}$ alkyl)-aminosulfonyl —SO$_2$—N(alkyl)$_2$, (C$_5$-C$_{24}$ aryl)-sulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O$^-$)$_2$), phosphinato (—P(O)(O$^-$)), phospho (—PO$_2$), and phosphino (—PH$_2$); and the hydrocarbyl moieties C$_1$-C$_{24}$ alkyl (preferably C$_1$-C$_{12}$ alkyl, more preferably C$_1$-C$_6$ alkyl), C$_2$-C$_{24}$ alkenyl (preferably C$_2$-C$_{12}$ alkenyl, more preferably C$_2$-C$_6$ alkenyl), C$_2$-C$_{24}$ alkynyl (preferably C$_2$-C$_{12}$ alkynyl, more preferably C$_2$-C$_6$ alkynyl), C$_5$-C$_{24}$ aryl (preferably C$_5$-C$_{14}$ aryl), C$_6$-C$_{24}$ alkaryl (preferably C$_6$-C$_{16}$ alkaryl), and C$_6$-C$_{24}$ aralkyl (preferably C$_6$-C$_{16}$ aralkyl).

By "Grubbs-Hoveyda ligands", is meant benzylidene ligands having a chelating alkyloxy group attached to the benzene ring at the ortho position.

By "sulfoxide group" is meant —[S(O)]—.

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described herein. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically enumerated herein. Analogously, the herein-mentioned hydrocarbyl moieties can be further substituted with one or more functional groups or additional hydrocarbyl moieties such as those specifically enumerated.

"Optional" or "optionally" means that the subsequently described circumstance can or cannot occur, so that the description includes instances where the circumstance occurs and instances where it does not. For example, the phrase "optionally substituted" means that a non-hydrogen substituent can or cannot be present on a given atom, and, thus, the description includes structures wherein a non-hydrogen substituent is present and structures wherein a non-hydrogen substituent is not present.

Olefin Metathesis Catalysts

In one embodiment, the invention provides an olefin metathesis catalyst, represented by the structure of Formula (I):

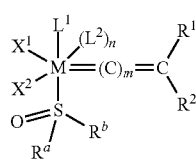

Formula (I)

wherein
M is a Group 8 transition metal; generally M is ruthenium or osmium; typically M is ruthenium;

L$^1$ and L$^2$ are independently neutral electron donor ligands;
n is 0 or 1; typically n is 0;
m is 0, 1 or 2; typically m is 0;
R$^1$ is hydrogen, unsubstituted hydrocarbyl, substituted hydrocarbyl, unsubstituted heteroatom-containing hydrocarbyl, or substituted heteroatom-containing hydrocarbyl; generally R$^a$ is unsubstituted C$_1$-C$_{10}$ alkyl, substituted C$_1$-C$_{10}$ alkyl, unsubstituted C$_3$-C$_{10}$ cycloalkyl, substituted C$_3$-C$_{10}$ cycloalkyl, unsubstituted C$_5$-C$_{24}$ aryl or substituted C$_5$-C$_{24}$ aryl; typically R$^a$ is methyl, ethyl, n-propyl, iso-propyl, n-butyl, tert-butyl, cyclohexyl or phenyl;
R$^b$ is hydrogen, unsubstituted hydrocarbyl, substituted hydrocarbyl, unsubstituted heteroatom-containing hydrocarbyl, or substituted heteroatom-containing hydrocarbyl; generally R$^b$ is unsubstituted C$_1$-C$_{10}$ alkyl, substituted C$_1$-C$_{10}$ alkyl, unsubstituted C$_3$-C$_{10}$ cycloalkyl, substituted C$_3$-C$_{10}$ cycloalkyl, unsubstituted C$_5$-C$_{24}$ aryl or substituted C$_5$-C$_{24}$ aryl; typically R$^b$ is methyl, ethyl, n-propyl, iso-propyl, n-butyl, tert-butyl, cyclohexyl or phenyl;
X$^1$ and X$^2$ are independently anionic ligands; generally X$^1$ and X$^2$ are independently halogen, trifluoroacetate, perfluorophenols or nitrate; typically X$^1$ and X$^2$ are independently Cl, Br, I or F;
R$^1$ and R$^2$ are independently hydrogen, unsubstituted hydrocarbyl, substituted hydrocarbyl, unsubstituted heteroatom-containing hydrocarbyl, or substituted heteroatom-containing hydrocarbyl; typically, R$^1$ is hydrogen and R$^2$ is unsubstituted phenyl, substituted phenyl or substituted 1-propenyl; or R$^1$ and R$^2$ are linked together to form an optionally substituted indenylidene.

In one embodiment, the invention provides an olefin metathesis catalyst, represented by the structure of Formula (I), wherein:
M is a Group 8 transition metal; generally M is ruthenium or osmium; typically M is ruthenium;
L$^1$ and L$^2$ are independently neutral electron donor ligands;
n is 0 or 1; typically n is 0;
m is 0, 1 or 2; typically m is 0;
R$^a$ and R$^b$ are linked together to form a five or a six heterocyclic membered ring with the sulfoxide group;
X$^1$ and X$^2$ are independently anionic ligands; generally X$^1$ and X$^2$ are independently halogen, trifluoroacetate, perfluorophenols or nitrate; typically X$^1$ and X$^2$ are independently Cl, Br, I or F;
R$^1$ and R$^2$ are independently hydrogen, unsubstituted hydrocarbyl, substituted hydrocarbyl, unsubstituted heteroatom-containing hydrocarbyl, or substituted heteroatom-containing hydrocarbyl; typically, R$^1$ is hydrogen and R$^2$ is unsubstituted phenyl, substituted phenyl or substituted 1-propenyl; or R$^1$ and R$^2$ are linked together to form an optionally substituted indenylidene.

In one embodiment, the invention provides an olefin metathesis catalyst, represented by the structure of Formula (II):

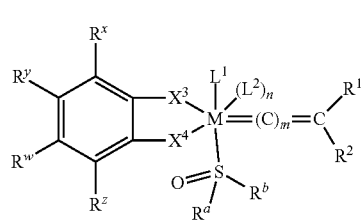

Formula (II)

wherein:
M is a Group 8 transition metal; generally M is ruthenium or osmium; typically M is ruthenium;
$L^1$ is a carbene;
$L^2$ is a neutral electron donor ligand;
n is 0 or 1; typically n is 0;
m is 0, 1 or 2; typically m is 0;
$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;
$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl;
$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;
$X^3$ and $X^4$ are independently O or S; and
$R^x$, $B^y$, $R^w$ and $R^z$ are independently hydrogen, halogen, unsubstituted hydrocarbyl, substituted hydrocarbyl, unsubstituted heteroatom-containing hydrocarbyl, or substituted heteroatom-containing hydrocarbyl; generally $R^x$, $R^y$, $R^w$ and $R^z$ are independently hydrogen, halogen, unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^x$, $R^y$, $R^w$ and $R^z$ are independently $C_1$-$C_6$ alkyl, hydrogen, unsubstituted phenyl, substituted phenyl or halogen; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

In one embodiment, the invention provides an olefin metathesis catalyst, represented by the structure of Formula (II), wherein:
M is Ru;
$L^1$ is a carbene;
n is 0;
m is 0;
$R^a$ is methyl, ethyl, n-propyl, iso-propyl, n-butyl, tert-butyl, cyclohexyl or phenyl;
$R^b$ is methyl, ethyl, n-propyl, iso-propyl, n-butyl, tert-butyl, cyclohexyl or phenyl; or
$R^a$ and $R^b$ are linked together to form a five or a six heterocyclic membered ring with the sulfoxide group;
$R^1$ is hydrogen and $R^2$ is unsubstituted phenyl, substituted phenyl or substituted 1-propenyl; or $R^1$ and $R^2$ are linked together to form an optionally substituted indenylidene;
$X^3$ and $X^4$ are independently S; and
$R^x$, $R^y$, $R^w$ and $R^z$ are independently hydrogen, halogen, unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^x$, $R^y$, $R^w$ and $R^z$ are independently $C_1$-$C_6$ alkyl, hydrogen, unsubstituted phenyl, substituted phenyl or halogen; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

In one embodiment, the invention provides an olefin metathesis catalyst, represented by the structure of Formula (III), Formula (III)

wherein:
M is a Group 8 transition metal; generally M is ruthenium or osmium; typically M is ruthenium;
$L^2$ is a neutral electron donor ligand;
n is 0 or 1; typically n is 0;
m is 0, 1 or 2; typically m is 0;
$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;
$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl;
$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F; and
$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;
X and Y are independently C, $CR^{3a}$, N, O, S, or P; only one of X or Y can be C or $CR^{3a}$; typically X and Y are independently N;
$Q^1$, $Q^2$, $R^3$, $R^{3a}$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $Q^1$, $Q^2$, $R^3$, $R^{3a}$ and $R^4$ are optionally linked to X or Y via a linker such as unsubstituted hydrocarbylene, substituted hydrocarbylene, unsubstituted heteroatom-containing hydrocarbylene, substituted heteroatom-containing hydrocarbylene, or —(CO)—; typically $Q^1$, $Q^2$, $R^3$, $R^{3a}$ and $R^4$ are directly linked to X or Y; and p is 0 when X is O or S, p is 1 when X is N, P or $CR^{3a}$, and p is 2 when X is C; q is 0 when Y is O or S, q is 1 when Y is N, P or $CR^{3a}$, and q is 2 when X is C.

In one embodiment, the invention provides an olefin metathesis catalyst, represented by the structure of Formula (III), wherein:

M is a Group 8 transition metal; generally M is ruthenium or osmium; typically M is ruthenium;

$L^2$ is a neutral electron donor ligand;

n is 0 or 1; typically n is 0;

m is 0, 1 or 2; typically m is 0;

$R^a$ and $R^b$ are linked together to form a five or a six heterocyclic membered ring with the sulfoxide group;

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F; and $R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;

X and Y are independently C, $CR^{3a}$, N, O, S, or P; only one of X or Y can be C or $CR^{3a}$; typically X and Y are independently N;

$Q^1$, $Q^2$, $R^3$, $R^{3a}$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $Q^1$, $Q^2$, $R^3$, $R^{3a}$ and $R^4$ are optionally linked to X or Y via a linker such as unsubstituted hydrocarbylene, substituted hydrocarbylene, unsubstituted heteroatom-containing hydrocarbylene, substituted heteroatom-containing hydrocarbylene, or —(CO)—; typically $Q^1$, $Q^2$, $R^3$, $R^{3a}$ and $R^4$ are directly linked to X or Y; and p is 0 when X is O or S, p is 1 when X is N, P or $CR^{3a}$, and p is 2 when X is C; q is 0 when Y is O or S, q is 1 when Y is N, P or $CR^{3a}$, and q is 2 when X is C.

In one embodiment, the invention provides an olefin metathesis catalyst, represented by the structure of Formula (IV):

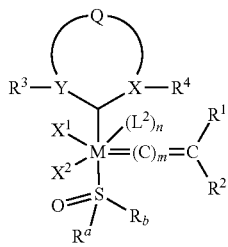

Formula (IV)

wherein:

M is a Group 8 transition metal;

$L^2$ is a neutral electron donor ligand;

n is 0 or 1;

m is 0, 1 or 2;

$R^a$ is hydrogen, unsubstituted hydrocarbyl, substituted hydrocarbyl, unsubstituted heteroatom-containing hydrocarbyl, or substituted heteroatom-containing hydrocarbyl;

$R^b$ is hydrogen, unsubstituted hydrocarbyl, substituted hydrocarbyl, unsubstituted heteroatom-containing hydrocarbyl, or substituted heteroatom-containing hydrocarbyl; or $R^a$ and $R^b$ are linked together to form a five or a six heterocyclic membered ring with the sulfoxide group;

$X^1$ and $X^2$ are independently anionic ligands;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

X and Y are independently C, $CR^{3a}$ or N; and only one of X or Y can be C or $CR^{3a}$;

$R^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a two-atom linkage having the structure —[$CR^{11}R^{12}$]$_s$—[$CR^{13}R^{14}$]$_t$— or —[$CR^{11}$=$CR^{13}$]—;

$R^{11}$, $R^{12}$, $R^{13}$, and $R^{14}$ are independently hydrogen, unsubstituted hydrocarbyl, substituted hydrocarbyl, unsubstituted heteroatom-containing hydrocarbyl, or substituted heteroatom-containing hydrocarbyl;

"s" and "t" are independently 1 or 2;

$R^3$ is unsubstituted hydrocarbyl, substituted hydrocarbyl, unsubstituted heteroatom-containing hydrocarbyl, or substituted heteroatom-containing hydrocarbyl; and $R^4$ is unsubstituted hydrocarbyl, substituted hydrocarbyl, unsubstituted heteroatom-containing hydrocarbyl, or substituted heteroatom-containing hydrocarbyl.

In one embodiment of Formula (IV), any two or more of $X^1$, $X^2$, $L^2$, $R^1$, and $R^2$ are optionally linked together to form a cyclic group, including bidentate or multidentate ligands; or any one or more of $X^1$, $X^2$, $L^2$, $R^1$, and $R^2$ is/are optionally attached to a support.

In one embodiment, the invention provides an olefin metathesis catalyst, represented by the structure of Formula (IV):

M is a Group 8 transition metal; generally M is ruthenium or osmium; typically M is ruthenium;

$L^2$ is a neutral electron donor ligand;

n is 0 or 1; typically n is 0;

m is 0, 1 or 2; typically m is 0;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl;

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;

X and Y are independently C, $CR^{3a}$, or N; only one of X or Y can be C or $CR^{3a}$; typically X and Y are independently N;

$R^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a linker, typically unsubstituted hydrocarbylene, substituted hydrocarbylene, unsubstituted heteroatom-containing hydrocarbylene, or substituted heteroatom-containing hydrocarbylene; generally Q is a two-atom linkage having the structure $-[CR^{11}R^{12}]_s-[CR^{13}R^{14}]_t-$ or $-[CR^{11}=CR^{13}]-$; typically Q is $-[CR^{11}R^{12}]_s-[CR^{13}R^{14}]_t-$, wherein $R^{11}$, $R^{12}$, $R^{13}$, and $R^{14}$ are independently hydrogen, unsubstituted hydrocarbyl, substituted hydrocarbyl, unsubstituted heteroatom-containing hydrocarbyl, or substituted heteroatom-containing hydrocarbyl; typically $R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; "s" and "t" are independently 1 or 2; typically "s" and "t" are independently 1; or any two of $R^{11}$, $R^{12}$, $R^{13}$, and $R^{14}$ are optionally linked together to form a substituted or unsubstituted, saturated or unsaturated ring structure;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted ($C_5$-$C_{24}$ aryl), ($C_5$-$C_{24}$ aryl) substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl, 2-fluoro-6-methylphenyl or 2-methyl-phenyl; and $R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted ($C_5$-$C_{24}$ aryl), or ($C_5$-$C_{24}$ aryl) substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl, 2-fluoro-6-methylphenyl or 2-methyl-phenyl; or when X is $CR^{3a}$, then $R^{3a}$ and $R^4$ can from together a five to ten membered cycloalkyl or heterocyclic ring, with the carbon atom to which they are attached.

In one embodiment, the invention provides an olefin metathesis catalyst, represented by the structure of Formula (IV), wherein:

M is a Group 8 transition metal; generally M is ruthenium or osmium; typically M is ruthenium;

$L^2$ is a neutral electron donor ligand;

n is 0 or 1; typically n is 0;

m is 0, 1 or 2; typically m is 0;

$R^a$ and $R^b$ are linked together to form a five or a six heterocyclic membered ring with the sulfoxide group;

$X^1$ and $X^2$ are independently anionic ligands; generally $X^1$ and $X^2$ are independently halogen, trifluoroacetate, perfluorophenols or nitrate; typically $X^1$ and $X^2$ are independently Cl, Br, I or F;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;

X and Y are independently C, $CR^{3a}$, or N; only one of X or Y can be C or $CR^{3a}$; typically X and Y are independently N;

$R^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a linker, typically unsubstituted hydrocarbylene, substituted hydrocarbylene, unsubstituted heteroatom-containing hydrocarbylene, or substituted heteroatom-containing hydrocarbylene; generally Q is a two-atom linkage having the structure $-[CR^{11}R^{12}]_s-[CR^{13}R^{14}]_t-$ or $-[CR^{11}=CR^{13}]-$; typically Q is $-[CR^{11}R^{12}]_s-[CR^{13}R^{14}]_t-$, wherein $R^{11}$, $R^{12}$, $R^{13}$, and $R^{14}$ are independently hydrogen, unsubstituted hydrocarbyl, substituted hydrocarbyl, unsubstituted heteroatom-containing hydrocarbyl, or substituted heteroatom-containing hydrocarbyl; typically $R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; "s" and "t" are independently 1 or 2; typically "s" and "t" are independently 1; or any two of $R^{11}$, $R^{12}$, $R^{13}$, and $R^{14}$ are optionally linked together to form a substituted or unsubstituted, saturated or unsaturated ring structure;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted ($C_5$-$C_{24}$ aryl), ($C_5$-$C_{24}$ aryl) substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2-iso-propyl-phenyl, 2,4,6-trimethylphenyl, 2,6-di-iso-propylphenyl, 2-iso-propyl-6-methylphenyl or 2-methyl-phenyl; and $R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted ($C_5$-$C_{24}$ aryl), or ($C_5$-$C_{24}$ aryl) substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2-iso-propyl-phenyl, 2,6-di-iso-propylphenyl, 2-iso-propyl-6-methylphenyl, or 2-methyl-phenyl.

In one embodiment, the invention provides an olefin metathesis catalyst, represented by the structure of Formula (IV), wherein:

M is Ru;
n is 0;
m is 0;
$R^a$ is hydrogen, unsubstituted hydrocarbyl, substituted hydrocarbyl, unsubstituted heteroatom-containing hydrocarbyl, or substituted heteroatom-containing hydrocarbyl; $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl;

$R^b$ is hydrogen, unsubstituted hydrocarbyl, substituted hydrocarbyl, unsubstituted heteroatom-containing hydrocarbyl, or substituted heteroatom-containing hydrocarbyl; $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; or $R^a$ and $R^b$ are linked together to form a five or a six heterocyclic membered ring with the sulfoxide group;

$X^1$ and $X^2$ are independently halogen, trifluoroacetate, per-fluorophenols or nitrate; generally $X^1$ and $X^2$ are independently Cl, Br, I or F;

$R^1$ is hydrogen;
$R^2$ is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

X and Y are independently N;
Q is a two-atom linkage having the structure —[$CR^{11}R^{12}$]$_s$—[$CR^{13}R^{14}$]$_t$—; $R^{11}$, $R^{12}$, $R^{13}$, and $R^{14}$ are independently hydrogen; "s" and "t" are independently 1; therefore, Q is —(CH$_2$—CH$_2$)—;

$R^3$ is unsubstituted hydrocarbyl, substituted hydrocarbyl, unsubstituted heteroatom-containing hydrocarbyl, or substituted heteroatom-containing hydrocarbyl; generally $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and $R^4$ is unsubstituted hydrocarbyl, substituted hydrocarbyl, unsubstituted heteroatom-containing hydrocarbyl, or substituted heteroatom-containing hydrocarbyl; generally $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

Therefore, the olefin metathesis catalyst of Formula (IV), can be represented by the structure of Formula (V)

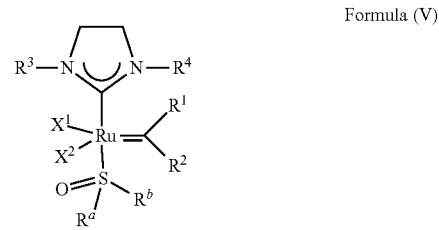

Formula (V)

wherein:
$R^1$ is hydrogen;
$R^2$ is unsubstituted hydrocarbyl, substituted hydrocarbyl, unsubstituted heteroatom-containing hydrocarbyl, or substituted heteroatom-containing hydrocarbyl; typically $R^2$ is unsubstituted phenyl, substituted phenyl or substituted 1-propenyl; or $R^1$ and $R^2$ are linked together to form an optionally substituted indenylidene;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl; and $R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2-iso-propyl-phenyl, 2,6-di-iso-propylphenyl, 2-iso-propyl-6-methylphenyl or 2-methyl-phenyl.

In one embodiment, the invention provides an olefin metathesis catalyst represented by the structure of Formula (V), wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; typically $R^2$ is unsubstituted phenyl, substituted phenyl or substituted 1-propenyl; or $R^1$ and $R^2$ are linked together to form an optionally substituted indenylidene;

$R^a$ and $R^b$ are linked together to form a five or a six heterocyclic membered ring with the sulfoxide group; typically, $R^a$ and $R^b$ are linked together to form a tetrahydrothiophene oxide;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl; and $R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2-iso-propyl-phenyl, 2,6-di-iso-propylphenyl, 2-iso-propyl-6-methylphenyl or 2-methyl-phenyl.

In one embodiment, the invention provides an olefin metathesis catalyst represented by the structure of Formula (V), wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

$R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl;

$R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; or $R^a$ and $R^b$ are linked together to form a five or a six heterocyclic membered ring with the sulfoxide group;

$X^1$ and $X^2$ are independently halogen;

$R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from $C_1$-$C_{20}$ alkyl, substituted unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

In one embodiment, the invention provides an olefin metathesis catalyst represented by the structure of Formula (V), wherein:

$R^1$ is hydrogen;

$R^2$ is unsubstituted phenyl, substituted phenyl or substituted 1-propenyl;

$R^a$ is methyl, ethyl, n-propyl, iso-propyl, n-butyl, tert-butyl, or phenyl;

$R^b$ is methyl, ethyl, n-propyl, iso-propyl, n-butyl, tert-butyl, or phenyl; or $R^a$ and $R^b$ are linked together to form a tetrahydrothiophene oxide;

$X^1$ and $X^2$ are independently Cl; and $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl; and $R^4$ is 2,4,6-trimethylphenyl, 2,6-di-iso-propylphenyl, 2-iso-propyl-6-methylphenyl, 2-iso-propyl-phenyl or 2-methyl-phenyl.

In one embodiment, the invention provides an olefin metathesis catalyst represented by the structure of Formula (V), wherein:

$R^1$ is hydrogen; $R^2$ is phenyl, 2-iso-propoxy-phenyl (i.e.

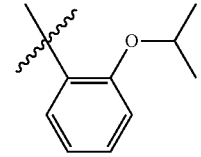 [SMILES: *c1ccccc1OC(C)C]

), or 2-methyl-1-propenyl (i.e —CH═C(CH$_3$)$_2$ or

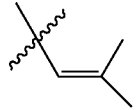

); or $R^1$ and $R^2$ are linked together to form 3-phenylinden-1-ylidene (i.e.

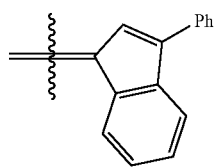 [SMILES: *=C1C=C(c2ccccc2)c2ccccc21]

);

$R^a$ is hydrogen, methyl, ethyl, n-propyl, iso-propyl, n-butyl, tert-butyl, or phenyl;

$R^b$ is hydrogen, methyl, ethyl, n-propyl, iso-propyl, n-butyl, tert-butyl, or phenyl;

$X^1$ and $X^2$ are independently Cl;

$R^3$ is phenyl, 2,4,6-trimethylphenyl, 2,6-di-iso-propylphenyl, adamantyl, 2-iso-propyl-phenyl, 2-methyl-phenyl or 2-isopropyl-6-methyl phenyl; and $R^4$ is phenyl, 2,4,6-trimethylphenyl, 2,6-di-iso-propylphenyl, 2-iso-propyl-phenyl, 2-methyl-phenyl or 2-isopropyl-6-methyl phenyl.

In one embodiment, the invention provides an olefin metathesis catalyst represented by the structure of Formula (V), wherein:

$R^1$ is hydrogen; $R^2$ is phenyl, 2-iso-propoxy-phenyl, or 2-methyl-1-propenyl; or $R^1$ and $R^2$ are linked together to form 3-phenylinden-1-ylidene;

$R^a$ and $R^b$ are linked together to form with the sulfoxide group a tetrahydrothiophene oxide;

$X^1$ and $X^2$ are independently Cl;

$R^3$ is phenyl, 2,4,6-trimethylphenyl, 2,6-di-iso-propylphenyl, adamantyl, 2-iso-propyl-phenyl, 2-methyl-phenyl or 2-isopropyl-6-methyl phenyl; and $R^4$ is phenyl, 2,4,6-trimethylphenyl, 2,6-di-iso-propylphenyl, 2-iso-propyl-phenyl, 2-methyl-phenyl or 2-isopropyl-6-methyl phenyl.

In one embodiment, the invention provides an olefin metathesis catalyst represented by the structure of Formula (V), wherein:

$R^1$ and $R^2$ are linked together to form 3-phenylinden-1-ylidene;

$R^a$ is methyl;

$R^b$ is methyl;

$X^1$ and $X^2$ are independently Cl;

$R^3$ is 2,4,6-trimethylphenyl; and $R^4$ is 2,4,6-trimethylphenyl.

Non-limiting examples of olefin metathesis catalysts represented by the structure of Formula (V) are described in Table (1), wherein $X^1$ is Cl and $X^2$ is Cl.

TABLE 1

| Catalyst | $R^1$ | $R^2$ | $R^3$ | $R^4$ | $R^a$ | $R^b$ |
|---|---|---|---|---|---|---|
| 1 | H | Ph | 2-Me—$C_6H_5$ | 2-Me—$C_6H_5$ | Me | Me |
| 2 | H | Ph | Mes | Mes | Me | Me |
| 3 | H | Ph | Mipp | Mipp | Me | Me |
| 4 | H | Ph | adamantyl | Mes | Me | Me |
| 5 | H | Ph | DIPP | DIPP | Me | Me |
| 6 | H | Ph | IPP | IPP | Me | Me |
| 7 | H | (2-methyl-1-propenyl) | 2-Me—$C_6H_5$ | 2-Me—$C_6H_5$ | Me | Me |
| 8 | H | (2-methyl-1-propenyl) | Mes | Mes | Me | Me |
| 9 | H | (2-methyl-1-propenyl) | Mipp | Mipp | Me | Me |
| 10 | H | (2-methyl-1-propenyl) | adamantyl | Mes | Me | Me |
| 11 | H | (2-methyl-1-propenyl) | DIPP | DIPP | Me | Me |
| 12 | H | (2-methyl-1-propenyl) | IPP | IPP | Me | Me |

TABLE 1-continued
| Catalyst | R¹ | R² | R³ | R⁴ | Rᵃ | Rᵇ |
|---|---|---|---|---|---|---|
| 13 | H | 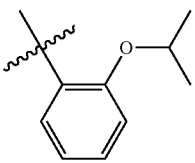 [SMILES: *c1ccccc1OC(C)C] | 2-Me—C₆H₅ | 2-Me—C₆H₅ | Me | Me |
| 14 | H | 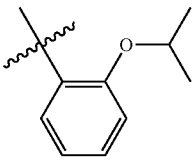 [SMILES: *c1ccccc1OC(C)C] | Mes | Mes | Me | Me |
| 15 | H | 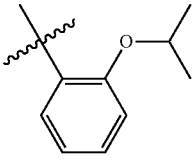 | Mipp | Mipp | Me | Me |
| 16 | H | 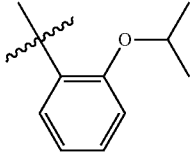 [SMILES: *c1ccccc1OC(C)C] | adamantyl | Mes | Me | Me |
| 17 | H | 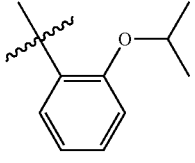 [SMILES: *c1ccccc1OC(C)C] | DIPP | DIPP | Me | Me |
| 18 | H | 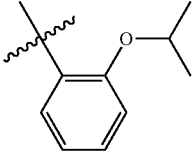 [SMILES: *c1ccccc1OC(C)C] | IPP | IPP | Me | Me |
| 19 | Ph | 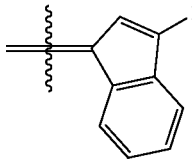 | 2-Me—C₆H₅ | 2-Me—C₆H₅ | Me | Me |
| 20 | Ph | 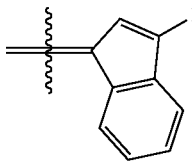 | Mes | Mes | Me | Me |
| 21 | Ph | 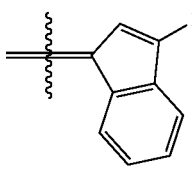 | Mipp | Mipp | Me | Me |

TABLE 1-continued

| Catalyst | R¹ | R² | R³ | R⁴ | Rᵃ | Rᵇ |
|---|---|---|---|---|---|---|
| 22 | | indene-Ph | adamantyl | Mes | Me | Me |
| 23 | | indene-Ph | DIPP | DIPP | Me | Me |
| 24 | | indene-Ph | IPP | IPP | Me | Me |
| 25 | H | Ph | 2-Me—C₆H₅ | 2-Me—C₆H₅ | cyclohexyl | |
| 26 | H | Ph | Mes | Mes | cyclohexyl | |
| 27 | H | Ph | Mipp | Mipp | cyclohexyl | |
| 28 | H | Ph | adamantyl | Mes | cyclohexyl | |
| 29 | H | Ph | DIPP | DIPP | cyclohexyl | |
| 30 | H | Ph | IPP | IPP | cyclohexyl | |

TABLE 1-continued
| Catalyst | R¹ | R² | R³ | R⁴ | Rᵃ | Rᵇ |
|---|---|---|---|---|---|---|
| 31 | H | 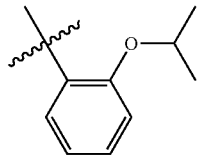 [SMILES: *c1ccccc1OC(C)C] | 2-Me—C₆H₅ | 2-Me—C₆H₅ |  | |
| 32 | H | 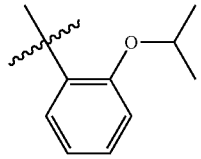 [SMILES: *c1ccccc1OC(C)C] | Mes | Mes |  | |
| 33 | H | 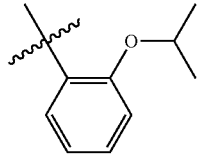 [SMILES: *c1ccccc1OC(C)C] | Mipp | Mipp |  | |
| 34 | H | 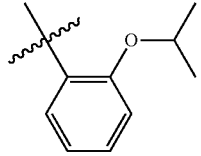 [SMILES: *c1ccccc1OC(C)C] | adamantyl | Mes |  | |
| 35 | H | 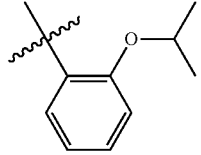 [SMILES: *c1ccccc1OC(C)C] | DIPP | DIPP |  | |
| 36 | H | 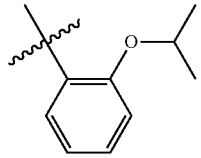 [SMILES: *c1ccccc1OC(C)C] | IPP | IPP | 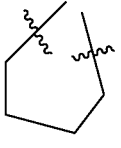 [SMILES: *CCCC*] | |
| 37 | H | 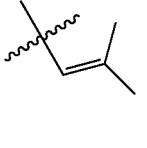 [SMILES: *C=C(C)C] | 2-Me—C₆H₅ | 2-Me—C₆H₅ |  | |
| 38 | H | 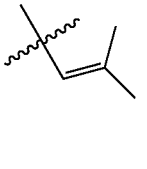 [SMILES: *C=C(C)C] | Mes | Mes |  | |
| 39 | H | 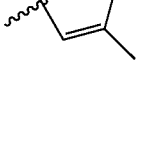 | Mipp | Mipp |  | |

TABLE 1-continued

| Catalyst | R¹ | R² | R³ | R⁴ | Rᵃ | Rᵇ |
|---|---|---|---|---|---|---|
| 40 | H | (2-methylbut-2-en-yl) | adamantyl | Mes | (cyclopentyl, shared) | |
| 41 | H | (2-methylbut-2-en-yl) | DIPP | DIPP | (cyclopentyl, shared) | |
| 42 | H | (2-methylbut-2-en-yl) | IPP | IPP | (cyclopentyl, shared) | |
| 43 | | (3-Ph-indenylidene) | 2-Me—C₆H₅ | 2-Me—C₆H₅ | (cyclopentyl, shared) | |
| 44 | | (3-Ph-indenylidene) | Mes | Mes | (cyclopentyl, shared) | |
| 45 | | (3-Ph-indenylidene) | Mipp | Mipp | (cyclopentyl, shared) | |
| 46 | | (3-Ph-indenylidene) | adamantyl | Mes | (cyclopentyl, shared) | |
| 47 | | (3-Ph-indenylidene) | DIPP | DIPP | (cyclopentyl, shared) | |
| 48 | | (3-Ph-indenylidene) | IPP | IPP | (cyclopentyl, shared) | |
| 49 | H | Ph | 2-Me—C₆H₅ | 2-Me—C₆H₅ | n-Bu | n-Bu |
| 50 | H | Ph | Mes | Mes | n-Bu | n-Bu |
| 51 | H | Ph | Mipp | Mipp | n-Bu | n-Bu |

TABLE 1-continued

| Catalyst | R¹ | R² | R³ | R⁴ | Rᵃ | Rᵇ |
|---|---|---|---|---|---|---|
| 52 | H | Ph | adamantyl | Mes | n-Bu | n-Bu |
| 53 | H | Ph | DIPP | DIPP | n-Bu | n-Bu |
| 54 | H | Ph | IPP | IPP | n-Bu | n-Bu |
| 55 | H | (2-methylbut-2-en-2-yl) | 2-Me—C₆H₅ | 2-Me—C₆H₅ | n-Bu | n-Bu |
| 56 | H | (2-methylbut-2-en-2-yl) | Mes | Mes | n-Bu | n-Bu |
| 57 | H | (2-methylbut-2-en-2-yl) | Mipp | Mipp | n-Bu | n-Bu |
| 58 | H | (2-methylbut-2-en-2-yl) | adamantyl | Mes | n-Bu | n-Bu |
| 59 | H | (2-methylbut-2-en-2-yl) | DIPP | DIPP | n-Bu | n-Bu |
| 60 | H | (2-methylbut-2-en-2-yl) | IPP | IPP | n-Bu | n-Bu |
| 61 | H | (2-isopropoxyphenyl) | 2-Me—C₆H₅ | 2-Me—C₆H₅ | n-Bu | n-Bu |
| 62 | H | (2-isopropoxyphenyl) | Mes | Mes | n-Bu | n-Bu |
| 63 | H | (2-isopropoxyphenyl) | Mipp | Mipp | n-Bu | n-Bu |

| | | | | | |
|---|---|---|---|---|---|
| 64 | H | 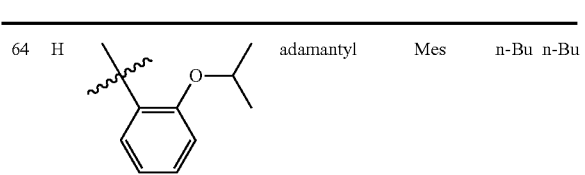 | adamantyl | Mes | n-Bu n-Bu |
| 65 | H | 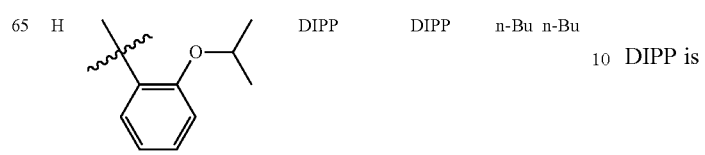 | DIPP | DIPP | n-Bu n-Bu |
| 66 | H | 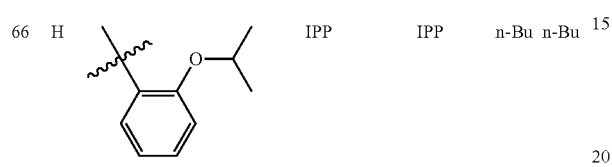 | IPP | IPP | n-Bu n-Bu |
| 67 | 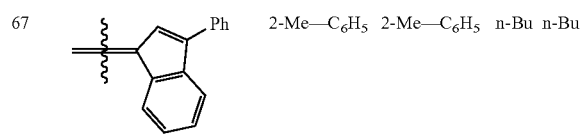 | | 2-Me—C₆H₅ | 2-Me—C₆H₅ | n-Bu n-Bu |
| 68 | 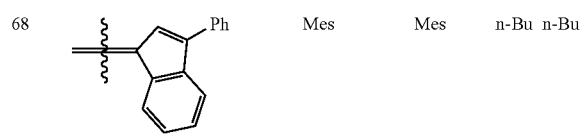 | | Mes | Mes | n-Bu n-Bu |
| 69 | 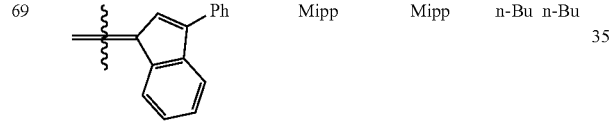 | | Mipp | Mipp | n-Bu n-Bu |
| 70 | 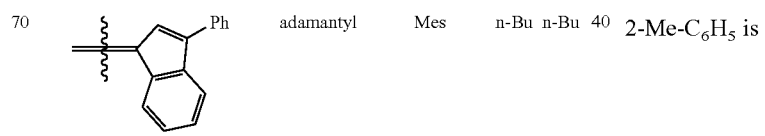 | | adamantyl | Mes | n-Bu n-Bu |
| 71 | 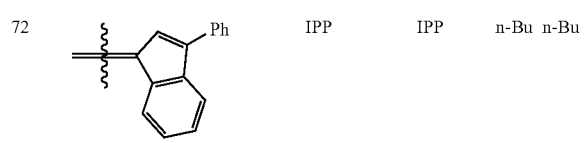 | | DIPP | DIPP | n-Bu n-Bu |
| 72 | 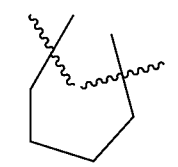 | | IPP | IPP | n-Bu n-Bu | wherein: Mes is

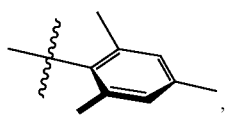

Mipp is

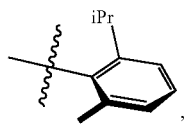

DIPP is

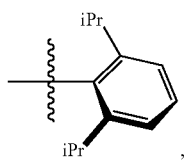

adamantyl is

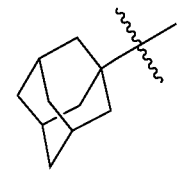 [SMILES: *CC12CC3CC(CC(C3)C1)C2]

IPP is

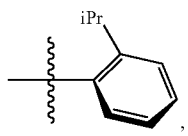

2-Me-C₆H₅ is

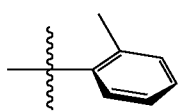

Me is methyl, n-Bu is butyl [CH₃—(CH₂)₃—], Ph is phenyl, and

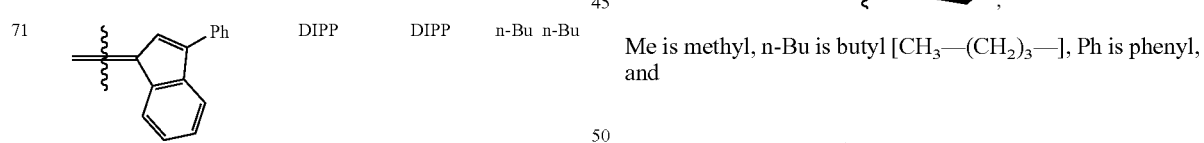

is [—(CH₂)₄—].

In one embodiment, the invention provides an olefin metathesis catalyst represented by the structure of Formula (IV), wherein:
M is Ru;
n is 0;
m is 0;
$R^a$ is hydrogen, unsubstituted hydrocarbyl, substituted hydrocarbyl, unsubstituted heteroatom-containing hydrocarbyl, or substituted heteroatom-containing hydrocarbyl; $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl;

$R^b$ is hydrogen, unsubstituted hydrocarbyl, substituted hydrocarbyl, unsubstituted heteroatom-containing hydrocarbyl, or substituted heteroatom-containing hydrocarbyl; $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; or $R^a$ and $R^b$ are linked together to form a five or a six heterocyclic membered ring with the sulfoxide group;

$X^1$ and $X^2$ are independently halogen, trifluoroacetate, per-fluorophenols or nitrate; generally $X^1$ and $X^2$ are independently Cl, Br, I or F;

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

X and Y are independently N;

Q is a two-atom linkage having the structure —[$CR^{11}$=$CR^{13}$]—; $R^{11}$ and $R^{13}$ are hydrogen; therefore, Q is —(CH=CH)—;

$R^3$ is unsubstituted hydrocarbyl, substituted hydrocarbyl, unsubstituted heteroatom-containing hydrocarbyl, or substituted heteroatom-containing hydrocarbyl; generally $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and $R^4$ is unsubstituted hydrocarbyl, substituted hydrocarbyl, unsubstituted heteroatom-containing hydrocarbyl, or substituted heteroatom-containing hydrocarbyl; generally $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

Therefore, the olefin metathesis catalyst of Formula (IV), can be represented by the structure of Formula (VI)

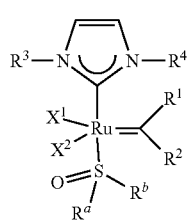

Formula (VI)

wherein:

$R^1$ is hydrogen;

$R^2$ is unsubstituted phenyl, substituted phenyl or substituted 1-propenyl; or $R^1$ and $R^2$ are linked together to form an optionally substituted indenylidene;

$R^a$ is hydrogen, unsubstituted hydrocarbyl, substituted hydrocarbyl, unsubstituted heteroatom-containing hydrocarbyl, or substituted heteroatom-containing hydrocarbyl; $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl;

$R^b$ is hydrogen, unsubstituted hydrocarbyl, substituted hydrocarbyl, unsubstituted heteroatom-containing hydrocarbyl, or substituted heteroatom-containing hydrocarbyl; $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; or $R^a$ and $R^b$ are linked together to form a five or a six heterocyclic membered ring with the sulfoxide group;

$X^1$ and $X^2$ are independently halogen, trifluoroacetate, per-fluorophenols or nitrate; $X^1$ and $X^2$ are independently Cl, Br, I or F; typically, $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_6$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl; and $R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2-iso-propyl-phenyl, 2,6-di-iso-propylphenyl, 2-iso-propyl-6-methylphenyl or 2-methyl-phenyl.

In one embodiment, the invention provides an olefin metathesis catalyst represented by the structure of Formula (VI), wherein:

$R^1$ is hydrogen; $R^2$ is phenyl, 2-iso-propoxy-phenyl, or 2-methyl-1-propenyl; or $R^1$ and $R^2$ are linked together to form 3-phenylinden-1-ylidene;

$R^a$ is hydrogen, methyl, ethyl, n-propyl, iso-propyl, n-butyl, tert-butyl, or phenyl;

$R^b$ is hydrogen, methyl, ethyl, n-propyl, iso-propyl, n-butyl, tert-butyl, or phenyl;

$X^1$ and $X^2$ are independently Cl; and $R^3$ is adamantyl, 2,4,6-trimethylphenyl, 2,6-di-iso-propylphenyl, 2-iso-propyl-6-methylphenyl or 2-methyl-phenyl; and $R^4$ is 2,4,6-trimethylphenyl, 2,6-di-iso-propylphenyl, 2-iso-propyl-6-methylphenyl or 2-methyl-phenyl.

In one embodiment, the invention provides an olefin metathesis catalyst represented by the structure of Formula (VI), wherein:

$R^1$ is hydrogen;

$R^2$ is unsubstituted phenyl, substituted phenyl or substituted 1-propenyl; or $R^1$ and $R^2$ are linked together to form an optionally substituted indenylidene;

$R^a$ and $R^b$ are linked together to form a five or a six heterocyclic membered ring with the sulfoxide group;

$X^1$ and $X^2$ are independently Cl, Br, I or F; $X^1$ and $X^2$ are independently Cl;

$R^3$ is adamantyl, 2,4,6-trimethylphenyl, 2,6-di-iso-propylphenyl, 2-iso-propyl-phenyl, 2-iso-propyl-6-methylphenyl or 2-methyl-phenyl; and $R^4$ is 2,4,6-trimethylphenyl, 2,6-di-iso-propylphenyl, 2-iso-propyl-phenyl, 2-iso-propyl-6-methylphenyl or 2-methyl-phenyl.

Non-limiting examples of olefin metathesis catalysts represented by the structure of Formula (VI) are described in Table (2), wherein $X^1$ is Cl and $X^2$ is Cl.

TABLE 2

| Catalyst | $R^1$ | $R^2$ | $R^3$ | $R^4$ | $R^a$ | $R^b$ |
|---|---|---|---|---|---|---|
| 73 | H | Ph | 2-Me—C$_6$H$_5$ | 2-Me—C$_6$H$_5$ | Me | Me |
| 74 | H | Ph | Mes | Mes | Me | Me |
| 75 | H | Ph | Mipp | Mipp | Me | Me |
| 76 | H | Ph | adamantyl | Mes | Me | Me |
| 77 | H | Ph | DIPP | DIPP | Me | Me |
| 78 | H | Ph | IPP | IPP | Me | Me |
| 79 | H | isobutenyl | 2-Me—C$_6$H$_5$ | 2-Me—C$_6$H$_5$ | Me | Me |
| 80 | H | isobutenyl | Mes | Mes | Me | Me |
| 81 | H | isobutenyl | Mipp | Mipp | Me | Me |
| 82 | H | isobutenyl | adamantyl | Mes | Me | Me |
| 83 | H | isobutenyl | DIPP | DIPP | Me | Me |
| 84 | H | isobutenyl | IPP | IPP | Me | Me |
| 85 | H | 2-(isopropoxy)phenyl | | 2-Me—C$_6$H$_5$ | 2-Me—C$_6$H$_5$ | Me | Me |
| 86 | H | 2-(isopropoxy)phenyl | Mes | Mes | Me | Me |

TABLE 2-continued
| Catalyst | R¹ | R² | R³ | R⁴ | Rᵃ | Rᵇ |
|---|---|---|---|---|---|---|
| 87 | H | 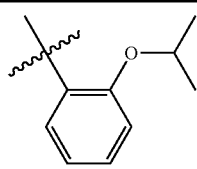 | Mipp | Mipp | Me | Me |
| 88 | H | 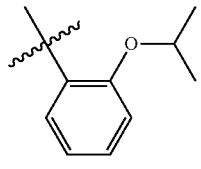 [SMILES: *c1ccccc1OC(C)C] | adamantyl | Mes | Me | Me |
| 89 | H | 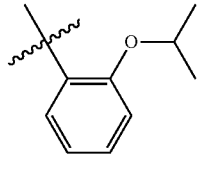 [SMILES: *c1ccccc1OC(C)C] | DIPP | DIPP | Me | Me |
| 90 | H | 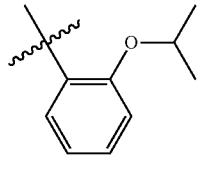 [SMILES: *c1ccccc1OC(C)C] | IPP | IPP | Me | Me |
| 91 | | 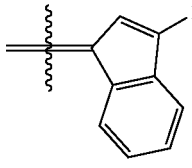 | 2-Me—C₆H₅ | 2-Me—C₆H₅ | Me | Me |
| 92 | | 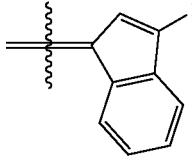 | Mes | Mes | Me | Me |
| 93 | | 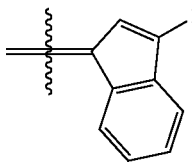 | Mipp | Mipp | Me | Me |
| 94 | | 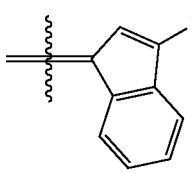 | adamantyl | Mes | Me | Me |
| 95 | | 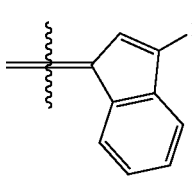 | DIPP | DIPP | Me | Me |

TABLE 2-continued

| Catalyst | R¹ | R² | R³ | R⁴ | Rᵃ | Rᵇ |
|---|---|---|---|---|---|---|
| 96 | | indenyl-Ph | IPP | IPP | Me | Me |
| 97 | H | Ph | 2-Me—C₆H₅ | 2-Me—C₆H₅ | cyclohexyl | |
| 98 | H | Ph | Mes | Mes | cyclohexyl | |
| 99 | H | Ph | Mipp | Mipp | cyclohexyl | |
| 100 | H | Ph | adamantyl | Mes | cyclohexyl | |
| 101 | H | Ph | DIPP | DIPP | cyclohexyl | |
| 102 | H | Ph | IPP | IPP | cyclohexyl | |
| 103 | H | 2-OiPr-C₆H₄ | 2-Me—C₆H₅ | 2-Me—C₆H₅ | cyclohexyl | |
| 104 | H | 2-OiPr-C₆H₄ | Mes | Mes | cyclohexyl | |

TABLE 2-continued
| Catalyst | R¹ | R² | R³ | R⁴ | Rᵃ | Rᵇ |
|---|---|---|---|---|---|---|
| 105 | H | 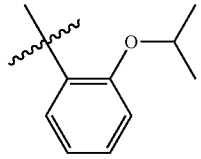 [SMILES: *c1ccccc1OC(C)C] | Mipp | Mipp | 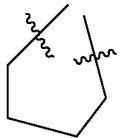 | |
| 106 | H | 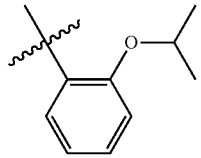 [SMILES: *c1ccccc1OC(C)C] | adamantyl | Mes | 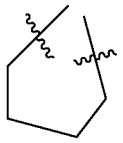 [SMILES: *CCCC*] | |
| 107 | H | 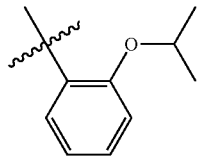 [SMILES: *c1ccccc1OC(C)C] | DIPP | DIPP | 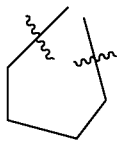 | |
| 108 | H | 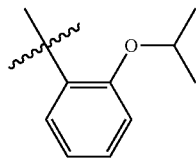 [SMILES: *c1ccccc1OC(C)C] | IPP | IPP | 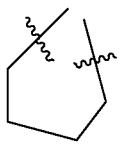 [SMILES: *CCCC*] | |
| 109 | H | 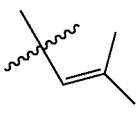 [SMILES: *C=C(C)C] | 2-Me—C₆H₅ | 2-Me—C₆H₅ | 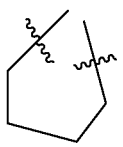 | |
| 110 | H | 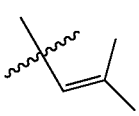 [SMILES: *C=C(C)C] | Mes | Mes | 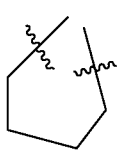 [SMILES: *CCCC*] | |
| 111 | H | 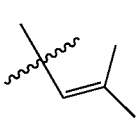 [SMILES: *C=C(C)C] | Mipp | Mipp | 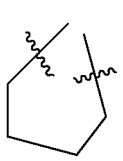 [SMILES: *CCCC*] | |
| 112 | H | 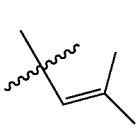 | adamantyl | Mes | 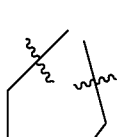 | |
| 113 | H | 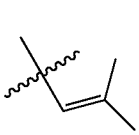 [SMILES: *C=C(C)C] | DIPP | DIPP | 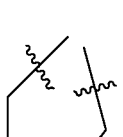 | |

TABLE 2-continued

| Catalyst | R¹ | R² | R³ | R⁴ | Rᵃ | Rᵇ |
|---|---|---|---|---|---|---|
| 114 | H | (2-methylpropenyl) | IPP | IPP | (cyclopentyl) | (cyclopentyl) |
| 115 | | (3-Ph-indenylidene) | 2-Me—C₆H₅ | 2-Me—C₆H₅ | (cyclopentyl) | (cyclopentyl) |
| 116 | | (3-Ph-indenylidene) | Mes | Mes | (cyclopentyl) | (cyclopentyl) |
| 117 | | (3-Ph-indenylidene) | Mipp | Mipp | (cyclopentyl) | (cyclopentyl) |
| 118 | | (3-Ph-indenylidene) | adamantyl | Mes | (cyclopentyl) | (cyclopentyl) |
| 119 | | (3-Ph-indenylidene) | DIPP | DIPP | (cyclopentyl) | (cyclopentyl) |
| 120 | | (3-Ph-indenylidene) | IPP | IPP | (cyclopentyl) | (cyclopentyl) |
| 121 | H | Ph | 2-Me—C₆H₅ | 2-Me—C₆H₅ | n-Bu | n-Bu |
| 122 | H | Ph | Mes | Mes | n-Bu | n-Bu |
| 123 | H | Ph | Mipp | Mipp | n-Bu | n-Bu |
| 124 | H | Ph | adamantyl | Mes | n-Bu | n-Bu |
| 125 | H | Ph | DIPP | DIPP | n-Bu | n-Bu |
| 126 | H | Ph | IPP | IPP | n-Bu | n-Bu |
| 127 | H | (2-methylpropenyl) | 2-Me—C₆H₅ | 2-Me—C₆H₅ | n-Bu | n-Bu |
| 128 | H | (2-methylpropenyl) | Mes | Mes | n-Bu | n-Bu |

TABLE 2-continued

| Catalyst | $R^1$ | $R^2$ | $R^3$ | $R^4$ | $R^a$ | $R^b$ |
|---|---|---|---|---|---|---|
| 129 | H | (2-methylpropenyl) | Mipp | Mipp | n-Bu | n-Bu |
| 130 | H | (2-methylpropenyl) | adamantyl | Mes | n-Bu | n-Bu |
| 131 | H | (2-methylpropenyl) | DIPP | DIPP | n-Bu | n-Bu |
| 132 | H | (2-methylpropenyl) | IPP | IPP | n-Bu | n-Bu |
| 133 | H | (2-isopropoxyphenyl) | 2-Me—$C_6H_5$ | 2-Me—$C_6H_5$ | n-Bu | n-Bu |
| 134 | H | (2-isopropoxyphenyl) | Mes | Mes | n-Bu | n-Bu |
| 135 | H | (2-isopropoxyphenyl) | Mipp | Mipp | n-Bu | n-Bu |
| 136 | H | (2-isopropoxyphenyl) | adamantyl | Mes | n-Bu | n-Bu |
| 137 | H | (2-isopropoxyphenyl) | DIPP | DIPP | n-Bu | n-Bu |
| 138 | H | (2-isopropoxyphenyl) | IPP | IPP | n-Bu | n-Bu |
| 139 | H | (3-phenyl-1H-inden-1-ylidene) | 2-Me—$C_6H_5$ | 2-Me—$C_6H_5$ | n-Bu | n-Bu |
| 140 | H | (3-phenyl-1H-inden-1-ylidene) | Mes | Mes | n-Bu | n-Bu |

| 141 | ![structure with Ph indenyl] | Mipp | Mipp | n-Bu | n-Bu |
| 142 | ![structure with Ph indenyl] | adamantyl | Mes | n-Bu | n-Bu |
| 143 | ![structure with Ph indenyl] | DIPP | DIPP | n-Bu | n-Bu |
| 144 | ![structure with Ph indenyl] | IPP | IPP | n-Bu | n-Bu |

In one embodiment, the invention provides an olefin metathesis catalyst represented by the structure of Formula (IV), wherein:

M is Ru;

n is 0;

m is 0;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group;

$X^1$ and $X^2$ are independently halogen, trifluoroacetate, per-fluorophenols or nitrate; typically $X^1$ and $X^2$ are independently Cl, Br, I or F;

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;

Y is N;

X is $CR^{3a}$;

$R^{3a}$ is hydrogen, unsubstituted hydrocarbyl, substituted hydrocarbyl, unsubstituted heteroatom-containing hydrocarbyl, or substituted heteroatom-containing hydrocarbyl; or $R^{3a}$ and $R^4$ can from together a five to ten membered cycloalkyl or heterocyclic ring, with the carbon atom to which they are attached;

Q is a two-atom linkage having the structure $—[CR^{11}R^{12}]_s—[CR^{13}R^{14}]_t—$; wherein $R^{11}$, $R^{12}$, $R^{13}$, and $R^{14}$ are independently hydrogen, unsubstituted hydrocarbyl, substituted hydrocarbyl, unsubstituted heteroatom-containing hydrocarbyl, or substituted heteroatom-containing hydrocarbyl; typically $R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_5$-$C_{14}$ aryl, or substituted $C_5$-$C_{14}$ aryl; "s" and "t" are independently 1;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted ($C_5$-$C_{24}$ aryl), ($C_5$-$C_{24}$ aryl) substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and $R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted ($C_5$-$C_{24}$ aryl), or ($C_5$-$C_{24}$ aryl) substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; or $R^{3a}$ and $R^4$ can from together a five to ten membered cycloalkyl or heterocyclic ring, with the carbon atom to which they are attached.

Therefore, the olefin metathesis catalyst of Formula (IV), can be represented by the structure of Formula (VII)

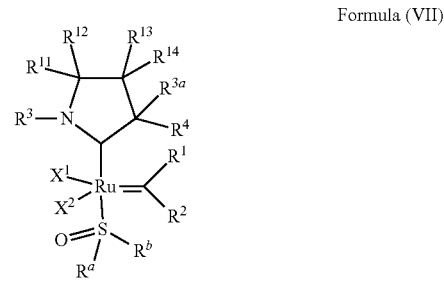

Formula (VII)

wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally, $R^2$ is unsubstituted phenyl, substituted phenyl or substituted 1-propenyl; or $R^1$ and $R^2$ are linked together to form an optionally substituted indenylidene;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^3$ is unsubstituted hydrocarbyl, substituted hydrocarbyl, unsubstituted heteroatom containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl or 2-methyl-phenyl;

$R^{11}$, $R^{12}$, $R^{13}$ and $R^{14}$ are independently hydrogen, unsubstituted hydrocarbyl, substituted hydrocarbyl, unsubstituted heteroatom-containing hydrocarbyl, or substituted heteroatom-containing hydrocarbyl; generally, $R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl; typically, $R^{11}$ and $R^{12}$ are independently methyl and $R^{13}$ and $R^{14}$ are independently hydrogen;

$R^{3a}$ is hydrogen, unsubstituted hydrocarbyl, substituted hydrocarbyl, unsubstituted heteroatom-containing hydrocarbyl, or substituted heteroatom-containing hydrocarbyl; generally, $R^{3a}$ is unsubstituted $C_1$-$C_{12}$ alkyl, substituted $C_1$-$C_{12}$ alkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl; typically $R^{3a}$ is methyl, ethyl, n-propyl, or phenyl; or together with $R^4$ can form a five to ten membered cycloalkyl or heterocyclic ring, with the carbon atom to which they are attached; and $R^4$ is hydrogen, unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_1$-$C_{12}$ alkyl, substituted $C_1$-$C_{12}$ alkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl; typically $R^4$ is methyl, ethyl, n-propyl, or phenyl; or together with $R^{3a}$ can form a five- to ten-membered cycloalkyl or heterocyclic ring, with the carbon atom to which they are attached.

In one embodiment, the invention provides an olefin metathesis catalyst represented by the structure of Formula (VII), wherein:

$R^1$ is hydrogen; $R^2$ is phenyl, 2-iso-propoxy-phenyl, or 2-methyl-1-propenyl; or $R^1$ and $R^2$ are linked together to form 3-phenylinden-1-ylidene;

$R^a$ is hydrogen, methyl, ethyl, n-propyl, iso-propyl, n-butyl, tert-butyl, or phenyl;

$R^b$ is hydrogen, methyl, ethyl, n-propyl, iso-propyl, n-butyl, tert-butyl, or phenyl;

$X^1$ and $X^2$ are independently Cl; and $R^3$ is 2,4,6-trimethylphenyl, 2,6-di-iso-propylphenyl, 2-iso-propyl-phenyl, 2-iso-propyl-6-methylphenyl, 2,6-diethylphenyl, 2-methyl-6-tert-butylphenyl, 2-ethyl-6-methylphenyl or 2-methyl-phenyl;

$R^{11}$ and $R^{12}$ are independently methyl;

$R^{13}$ and $R^{14}$ are independently hydrogen;

$R^{3a}$ is methyl, ethyl, n-propyl, or phenyl; and $R^4$ is methyl, ethyl, n-propyl, or phenyl; or $R^{13a}$ and $R^4$ form together a five-, six-, or ten-membered cycloalkyl or heterocycle ring, with the carbon atom to which they are attached.

Non-limiting examples of olefin metathesis catalysts represented by the structure of Formula (VII) are described in Table (3), wherein $X^1$ is Cl, $X^2$ is Cl, $R^{11}$ is methyl, $R^{12}$ is methyl, $R^{13}$ is hydrogen and $R^{14}$ is hydrogen.

TABLE 3

| Catalyst | $R^1$ | $R^2$ | $R^a$ | $R^b$ | $R^3$ | $R^{3a}$ | $R^4$ |
|---|---|---|---|---|---|---|---|
| 145 | H | Ph | Me | Me | 2-Me—$C_6H_5$ | Me | Me |
| 146 | H | Ph | Me | Me | Mes | Me | Me |
| 147 | H | Ph | Me | Me | Mipp | Me | Me |
| 148 | H | Ph | Me | Me | EMP | Me | Me |
| 149 | H | Ph | Me | Me | DIPP | Me | Me |
| 150 | H | Ph | Me | Me | IPP | Me | Me |
| 151 | H | (2-methyl-1-propenyl) | Me | Me | 2-Me—$C_6H_5$ | Me | Me |

TABLE 3-continued

| Catalyst | R¹ | R² | Rᵃ | Rᵇ | R³ | R³ᵃ | R⁴ |
| --- | --- | --- | --- | --- | --- | --- | --- |
| 152 | H | 2-methylpropenyl | Me | Me | Mes | Me | Me |
| 153 | H | 2-methylpropenyl | Me | Me | Mipp | Me | Me |
| 154 | H | 2-methylpropenyl | Me | Me | EMP | Me | Me |
| 155 | H | 2-methylpropenyl | Me | Me | DIPP | Me | Me |
| 156 | H | 2-methylpropenyl | Me | Me | IPP | Me | Me |
| 157 | H | 2-isopropoxyphenyl | Me | Me | 2-Me—C₆H₅ | Me | Me |
| 158 | H | 2-isopropoxyphenyl | Me | Me | Mes | Me | Me |
| 159 | H | 2-isopropoxyphenyl | Me | Me | Mipp | Me | Me |
| 160 | H | 2-isopropoxyphenyl | Me | Me | EMP | Me | Me |
| 161 | H | 2-isopropoxyphenyl | Me | Me | DIPP | Me | Me |
| 162 | H | 2-isopropoxyphenyl | Me | Me | IPP | Me | Me |

TABLE 3-continued

| Catalyst | R¹ | R² | Rᵃ | Rᵇ | R³ | R³ᵃ | R⁴ |
|---|---|---|---|---|---|---|---|
| 163 | | 1-Ph-indenylidene | Me | Me | 2-Me—C₆H₅ | Me | Me |
| 164 | | 1-Ph-indenylidene | Me | Me | Mes | Me | Me |
| 165 | | 1-Ph-indenylidene | Me | Me | Mipp | Me | Me |
| 166 | | 1-Ph-indenylidene | Me | Me | EMP | Me | Me |
| 167 | | 1-Ph-indenylidene | Me | Me | DIPP | Me | Me |
| 168 | | 1-Ph-indenylidene | Me | Me | IPP | Me | Me |
| 169 | H | Ph | cyclopentyl (Rᵃ,Rᵇ fused) | | 2-Me—C₆H₅ | Me | Me |
| 170 | H | Ph | cyclopentyl (Rᵃ,Rᵇ fused) | | Mes | Me | Me |
| 171 | H | Ph | cyclopentyl (Rᵃ,Rᵇ fused) | | Mipp | Me | Me |

TABLE 3-continued

| Catalyst | R¹ | R² | Rᵃ | Rᵇ | R³ | R³ᵃ | R⁴ |
|---|---|---|---|---|---|---|---|
| 172 | H | Ph | | cyclopentyl | EMP | Me | Me |
| 173 | H | Ph | | cyclopentyl | DIPP | Me | Me |
| 174 | H | Ph | | cyclopentyl | IPP | Me | Me |
| 175 | H | 2-OiPr-C₆H₄ | | cyclohexyl | 2-Me—C₆H₅ | Me | Me |
| 176 | H | 2-OiPr-C₆H₄ | | cyclohexyl | Mes | Me | Me |
| 177 | H | 2-OiPr-C₆H₄ | | cyclohexyl | Mipp | Me | Me |
| 178 | H | 2-OiPr-C₆H₄ | | cyclohexyl | EMP | Me | Me |
| 179 | H | 2-OiPr-C₆H₄ | | cyclohexyl | DIPP | Me | Me |
| 180 | H | 2-OiPr-C₆H₄ | | cyclohexyl | IPP | Me | Me |

TABLE 3-continued

| Catalyst | R¹ | R² | Rᵃ | Rᵇ | R³ | R³ᵃ | R⁴ |
|---|---|---|---|---|---|---|---|
| 181 | H | (2-methylbut-2-enyl) | (cyclohexyl, shared) | | 2-Me—C₆H₅ | Me | Me |
| 182 | H | (2-methylbut-2-enyl) | (cyclohexyl, shared) | | Mes | Me | Me |
| 183 | H | (2-methylbut-2-enyl) | (cyclohexyl, shared) | | Mipp | Me | Me |
| 184 | H | (2-methylbut-2-enyl) | (cyclohexyl, shared) | | EMP | Me | Me |
| 185 | H | (2-methylbut-2-enyl) | (cyclohexyl, shared) | | DIPP | Me | Me |
| 186 | H | (2-methylbut-2-enyl) | (cyclohexyl, shared) | | IPP | Me | Me |
| 187 | | (3-phenyl-1H-inden-1-ylidene)methyl | (cyclohexyl, shared) | | 2-Me—C₆H₅ | Me | Me |
| 188 | | (3-phenyl-1H-inden-1-ylidene)methyl | (cyclohexyl, shared) | | Mes | Me | Me |
| 189 | | (3-phenyl-1H-inden-1-ylidene)methyl | (cyclohexyl, shared) | | Mipp | Me | Me |
| 190 | | (3-phenyl-1H-inden-1-ylidene)methyl | (cyclohexyl, shared) | | EMP | Me | Me |
| 191 | | (3-phenyl-1H-inden-1-ylidene)methyl | (cyclohexyl, shared) | | DIPP | Me | Me |
| 192 | | (3-phenyl-1H-inden-1-ylidene)methyl | (cyclohexyl, shared) | | IPP | Me | Me |
| 193 | H | Ph | n-Bu | n-Bu | 2-Me—C₆H₅ | Me | Me |
| 194 | H | Ph | n-Bu | n-Bu | Mes | Me | Me |
| 195 | H | Ph | n-Bu | n-Bu | Mipp | Me | Me |
| 196 | H | Ph | n-Bu | n-Bu | EMP | Me | Me |

| | | | | | | |
|---|---|---|---|---|---|---|
| 197 | H | Ph | n-Bu | n-Bu | DIPP | Me Me |
| 198 | H | Ph | n-Bu | n-Bu | IPP | Me Me |
| 199 | H | (prenyl) | n-Bu | n-Bu | 2-Me—C$_6$H$_5$ | Me Me |
| 200 | H | (prenyl) | n-Bu | n-Bu | Mes | Me Me |
| 201 | H | (prenyl) | n-Bu | n-Bu | Mipp | Me Me |
| 202 | H | (prenyl) | n-Bu | n-Bu | EMP | Me Me |
| 203 | H | (prenyl) | n-Bu | n-Bu | DIPP | Me Me |
| 204 | H | (prenyl) | n-Bu | n-Bu | IPP | Me Me |
| 205 | H | (2-OiPr-C$_6$H$_4$) | n-Bu | n-Bu | 2-Me—C$_6$H$_5$ | Me Me |
| 206 | H | (2-OiPr-C$_6$H$_4$) | n-Bu | n-Bu | Mes | Me Me |
| 207 | H | (2-OiPr-C$_6$H$_4$) | n-Bu | n-Bu | Mipp | Me Me |
| 208 | H | (2-OiPr-C$_6$H$_4$) | n-Bu | n-Bu | EMP | Me Me |
| 209 | H | (2-OiPr-C$_6$H$_4$) | n-Bu | n-Bu | DIPP | Me Me |
| 210 | H | (2-OiPr-C$_6$H$_4$) | n-Bu | n-Bu | IPP | Me Me |
| 211 | (3-Ph-indenylidene) | n-Bu | n-Bu | 2-Me—C$_6$H$_5$ | Me Me |
| 212 | (3-Ph-indenylidene) | n-Bu | n-Bu | Mes | Me Me |
| 213 | (3-Ph-indenylidene) | n-Bu | n-Bu | Mipp | Me Me |
| 214 | (3-Ph-indenylidene) | n-Bu | n-Bu | EMP | Me Me |
| 215 | (3-Ph-indenylidene) | n-Bu | n-Bu | DIPP | Me Me |
| 216 | (3-Ph-indenylidene) | n-Bu | n-Bu | IPP | Me Me | wherein EMP is

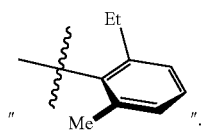

.

In another embodiment of Formula (IV), the invention provides an olefin metathesis catalyst wherein:

M is a Group 8 transition metal; generally M is ruthenium or osmium; typically M is ruthenium;

$L^2$ is a neutral electron donor ligand;

n is 0 or 1; typically n is 0;

m is 0, 1 or 2; typically m is 0;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group;

X and Y are independently C, $CR^{3a}$ or N; and only one of X or Y can be C or $CR^{3a}$;

$R^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a two-atom linkage having the structure $—[CR^{11}R^{12}]_s—[CR^{13}R^{14}]_t—$ or $—[CR^{11}=CR^{13}]—$;

$R^{11}$, $R^{12}$, $R^{13}$, and $R^{14}$ are independently hydrogen, unsubstituted hydrocarbyl, substituted hydrocarbyl, unsubstituted heteroatom-containing hydrocarbyl, or substituted heteroatom-containing hydrocarbyl;

"s" and "t" are independently 1 or 2;

$R^3$ is unsubstituted hydrocarbyl, substituted hydrocarbyl, unsubstituted heteroatom-containing hydrocarbyl, or substituted heteroatom-containing hydrocarbyl;

$R^4$ is unsubstituted hydrocarbyl, substituted hydrocarbyl, unsubstituted heteroatom-containing hydrocarbyl, or substituted heteroatom-containing hydrocarbyl;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene:

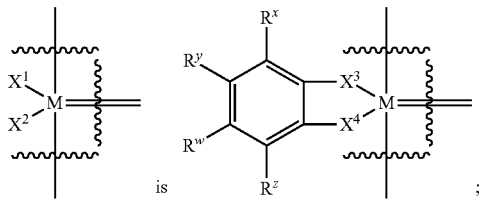

$X^3$ and $X^4$ are independently O or S; and $R^x$, $R^y$, $R^w$ and $R^z$ are independently hydrogen, halogen, unsubstituted hydrocarbyl, substituted hydrocarbyl, unsubstituted heteroatom-containing hydrocarbyl, or substituted heteroatom-containing hydrocarbyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

In another embodiment of Formula (IV), the invention provides an olefin metathesis catalyst wherein:

M is Ru;

n is 0;

m is 0;

$R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group;

X and Y are independently N;

Q is a two-atom linkage having the structure $—[CR^{11}R^{12}]_s—[CR^{13}R^{14}]_t—$;

$R^{11}$, $R^{12}$, $R^{13}$, and $R^{14}$ are independently $C_1$-$C_6$ alkyl, or hydrogen; generally $R^{11}$ is hydrogen or methyl, $R^{12}$ is hydrogen or methyl, $R^{13}$ is hydrogen and $R^{14}$ is hydrogen; typically $R^{11}$, $R^{12}$, $R^{13}$, and $R^{14}$ are independently hydrogen;

"s" and "t" are independently 1;

$R^3$ is unsubstituted hydrocarbyl, substituted hydrocarbyl, unsubstituted heteroatom-containing hydrocarbyl, or substituted heteroatom-containing hydrocarbyl;

$R^4$ is unsubstituted hydrocarbyl, substituted hydrocarbyl, unsubstituted heteroatom-containing hydrocarbyl, or substituted heteroatom-containing hydrocarbyl;

$R^1$ is hydrogen and $R^2$ is unsubstituted phenyl, substituted phenyl or substituted 1-propenyl; or $R^1$ and $R^2$ are linked together to form an optionally substituted indenylidene;

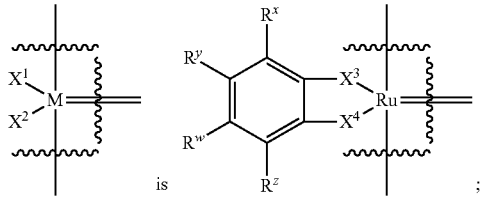

$X^3$ and $X^4$ are independently S; and $R^x$, $R^y$, $R^w$ and $R^z$ are independently $C_1$-$C_6$ alkyl, hydrogen, halogen, unsubstituted phenyl or substituted phenyl; generally $R^x$ is methyl, hydrogen or Cl, $R^y$ is hydrogen, $R^w$ is hydrogen, $R^z$ is Cl, t-butyl, hydrogen or phenyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

Therefore, the olefin metathesis catalyst of Formula (IV), can be represented by the structure of Formula (VIII)

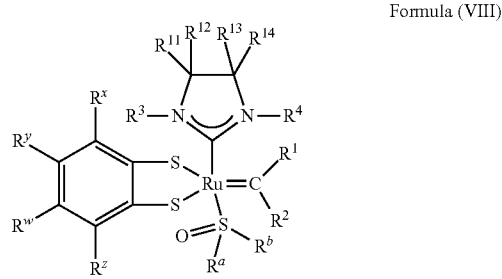

Formula (VIII)

wherein:

$R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl;

typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group;

$R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 2,6-difluorophenyl, 3,5-di-tert-butylphenyl, 2,4-dimethylphenyl or 2-methyl-phenyl;

$R^4$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 2,6-difluorophenyl, 3,5-di-tert-butylphenyl, 2,4-dimethylphenyl or 2-methyl-phenyl;

$R^1$ is hydrogen and $R^2$ is unsubstituted phenyl, substituted phenyl or substituted 1-propenyl; or $R^1$ and $R^2$ are linked together to form an optionally substituted indenylidene;

$R^{11}$, $R^{12}$, $R^{13}$, and $R^{14}$ are independently $C_1$-$C_6$ alkyl, or hydrogen; generally $R^{11}$ is hydrogen or methyl, $R^{12}$ is hydrogen or methyl, $R^{13}$ is hydrogen and $R^{14}$ is hydrogen; typically $R^{11}$, $R^{12}$, $R^{13}$, and $R^{14}$ are independently hydrogen;

$R^x$, $R^y$, $R^w$ and $R^z$ are independently $C_1$-$C_6$ alkyl, hydrogen, halogen, unsubstituted phenyl or substituted phenyl; generally $R^x$ is methyl, hydrogen or Cl, $R^y$ is hydrogen, $R^w$ is hydrogen, $R^z$ is Cl, t-butyl, hydrogen or phenyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

In one embodiment, the invention provides an olefin metathesis catalyst represented by the structure of Formula (VIII), wherein:

$R^a$ is methyl, ethyl, n-propyl, iso-propyl, n-butyl, tert-butyl, cyclohexyl or phenyl;

$R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group;

$R^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

$R^4$ is 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

$R^1$ is hydrogen and $R^2$ is unsubstituted phenyl, substituted phenyl or substituted 1-propenyl; or $R^1$ and $R^2$ are linked together to form an optionally substituted indenylidene;

$R^{11}$ is hydrogen or methyl, $R^{12}$ is hydrogen or methyl, $R^{13}$ is hydrogen and $R^{14}$ is hydrogen; typically $R^{11}$, $R^{12}$, $R^{13}$, and $R^{14}$ are independently hydrogen;

$R^x$ is methyl, hydrogen or Cl, $R^y$ is hydrogen, $R^w$ is hydrogen, $R^z$ is Cl, t-butyl, hydrogen or phenyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

Non-limiting examples of olefin metathesis catalysts represented by the structure of Formula (VIII) are described in Table (4), wherein $R^a$ is methyl, $R^b$ is methyl, $R^{11}$ is hydrogen, $R^{12}$ is hydrogen, $R^{13}$ is hydrogen, $R^{14}$ is hydrogen, $R^y$ is hydrogen and $R^w$ is hydrogen.

TABLE 4

| Catalyst | $R^1$ | $R^2$ | $R^3$ | $R^4$ | $R^x$ | $R^z$ |
|---|---|---|---|---|---|---|
| 217 | H | Ph | 2-Me—$C_6H_5$ | 2-Me—$C_6H_5$ | Cl | Cl |
| 218 | H | Ph | Mes | Mes | Cl | Cl |
| 219 | H | Ph | Mipp | Mipp | Cl | Cl |
| 220 | H | Ph | DIPP | DIPP | Cl | Cl |
| 221 | H | Ph | IPP | IPP | Cl | Cl |
| 222 | H | (alkenyl group) | 2-Me—$C_6H_5$ | 2-Me—$C_6H_5$ | Cl | Cl |
| 223 | H | (alkenyl group) | Mes | Mes | Cl | Cl |

TABLE 4-continued

| Catalyst | R¹ | R² | R³ | R⁴ | Rˣ | R² |
|---|---|---|---|---|---|---|
| 224 | H | (isobutenyl group) | Mipp | Mipp | Cl | Cl |
| 225 | H | (isobutenyl group) | DIPP | DIPP | Cl | Cl |
| 226 | H | (isobutenyl group) | IPP | IPP | Cl | Cl |
| 227 | H | (2-isopropoxyphenyl group) | 2-Me—C₆H₅ | 2-Me—C₆H₅ | Cl | Cl |
| 228 | H | (2-isopropoxyphenyl group) | Mes | Mes | Cl | Cl |
| 229 | H | (2-isopropoxyphenyl group) | Mipp | Mipp | Cl | Cl |
| 230 | H | (2-isopropoxyphenyl group) | DIPP | DIPP | Cl | Cl |
| 231 | H | (2-isopropoxy-4-phenyl-phenyl group) | 2-Me—C₆H₅ | 2-Me—C₆H₅ | Cl | Cl |
| 232 | H | (2-isopropoxy-4-phenyl-phenyl group) | Mes | Mes | Cl | Cl |

TABLE 4-continued

| Catalyst | R¹ | R² | R³ | R⁴ | Rˣ | R^z |
|---|---|---|---|---|---|---|
| 233 | H | 4-(isopropoxy)-3-phenyl-phenyl group | Mipp | Mipp | Cl | Cl |
| 234 | H | 4-(isopropoxy)-3-phenyl-phenyl group | DIPP | DIPP | Cl | Cl |
| 235 | H | 4-(isopropoxy)-3-phenyl-phenyl group | IPP | IPP | Cl | Cl |
| 236 | H | 4-(isopropoxy)-3-phenyl-phenyl group | IPP | IPP | Cl | Cl |
| 237 | 3-Ph-indenylidene | | 2-Me—$C_6H_5$ | 2-Me—$C_6H_5$ | Cl | Cl |
| 238 | 3-Ph-indenylidene | | Mes | Mes | Cl | Cl |

TABLE 4-continued

| Catalyst | R$^1$ | R$^2$ | R$^3$ | R$^4$ | R$^x$ | R$^z$ |
|---|---|---|---|---|---|---|
| 239 | | 3-Ph-indenylidene | Mipp | Me | Cl | Cl |
| 240 | | 3-Ph-indenylidene | DIPP | DIPP | Cl | Cl |
| 241 | | 3-Ph-indenylidene | IPP | Me | Cl | Cl |
| 242 | H | Ph | 2-Me—C$_6$H$_5$ | 2-Me—C$_6$H$_5$ | H | Ph |
| 243 | H | Ph | Mes | Mes | H | Ph |
| 244 | H | Ph | Mipp | Mipp | H | Ph |
| 245 | H | Ph | DIPP | DIPP | H | Ph |
| 246 | H | Ph | IPP | IPP | H | Ph |
| 247 | H | 2-isopropoxyphenyl | 2-Me—C$_6$H$_5$ | 2-Me—C$_6$H$_5$ | H | Ph |
| 248 | H | 2-isopropoxyphenyl | Mes | Mes | H | Ph |
| 249 | H | 2-isopropoxyphenyl | Mipp | Mipp | H | Ph |
| 250 | H | 2-isopropoxyphenyl | DIPP | DIPP | H | Ph |
| 251 | H | 2-isopropoxyphenyl | IPP | IPP | H | Ph |
| 252 | H | 2-methylprop-1-enyl | 2-Me—C$_6$H$_5$ | 2-Me—C$_6$H$_5$ | H | Ph |

TABLE 4-continued

| Catalyst | R¹ | R² | R³ | R⁴ | Rˣ | R^z |
|---|---|---|---|---|---|---|
| 253 | H | (2-methylpropenyl group) | Mes | Mes | H | Ph |
| 254 | H | (2-methylpropenyl group) | Mipp | Mipp | H | Ph |
| 255 | H | (2-methylpropenyl group) | DIPP | DIPP | H | Ph |
| 256 | H | (2-methylpropenyl group) | IPP | IPP | H | Ph |
| 257 | | (3-Ph-indenylidene) | 2-Me—C₆H₅ | 2-Me—C₆H₅ | H | Ph |
| 258 | | (3-Ph-indenylidene) | Mes | Mes | H | Ph |
| 259 | | (3-Ph-indenylidene) | Mipp | Mipp | H | Ph |
| 260 | | (3-Ph-indenylidene) | DIPP | DIPP | H | Ph |
| 261 | | (3-Ph-indenylidene) | IPP | IPP | H | Ph |
| 262 | H | Ph | 2-Me—C₆H₅ | 2-Me—C₆H₅ | Me | t-Bu |
| 263 | H | Ph | Mes | Mes | Me | t-Bu |
| 264 | H | Ph | Mipp | Mipp | Me | t-Bu |
| 265 | H | Ph | DIPP | DIPP | Me | t-Bu |
| 266 | H | Ph | IPP | IPP | Me | t-Bu |
| 267 | H | (2-methylpropenyl group) | 2-Me—C₆H₅ | 2-Me—C₆H₅ | Me | t-Bu |

TABLE 4-continued

| Catalyst | R¹ | R² | R³ | R⁴ | Rˣ | Rᶻ |
|---|---|---|---|---|---|---|
| 268 | H | (2-methylprop-1-enyl) | Mes | Mes | Me | t-Bu |
| 269 | H | (2-methylprop-1-enyl) | Mipp | Mipp | Me | t-Bu |
| 270 | H | (2-methylprop-1-enyl) | DIPP | DIPP | Me | t-Bu |
| 271 | H | (2-methylprop-1-enyl) | IPP | IPP | Me | t-Bu |
| 272 | H | (2-isopropoxyphenyl) | 2-Me—C₆H₅ | 2-Me—C₆H₅ | Me | t-Bu |
| 273 | H | (2-isopropoxyphenyl) | Mes | Mes | Me | t-Bu |
| 274 | H | (2-isopropoxyphenyl) | Mipp | Mipp | Me | t-Bu |
| 275 | H | (2-isopropoxyphenyl) | DIPP | DIPP | Me | t-Bu |
| 276 | H | (2-isopropoxyphenyl) | IPP | IPP | Me | t-Bu |
| 277 | (3-Ph-indenylidene) | | 2-Me—C₆H₅ | 2-Me—C₆H₅ | Me | t-Bu |

TABLE 4-continued

| Catalyst | R¹ | R² | R³ | R⁴ | Rˣ | Rᶻ |
|---|---|---|---|---|---|---|
| 278 | (3-phenyl-1-indenylidene) | Ph | Mes | Mes | Me | t-Bu |
| 279 | (3-phenyl-1-indenylidene) | Ph | Mipp | Mipp | Me | t-Bu |
| 280 | (3-phenyl-1-indenylidene) | Ph | DIPP | DIPP | Me | t-Bu |
| 281 | (3-phenyl-1-indenylidene) | Ph | IPP | IPP | Me | t-Bu |

The present invention also concerns processes for synthesizing the olefin metathesis catalysts of the invention. The olefin metathesis catalysts according to the invention can be prepared analogously to conventional methods as understood by the person skilled in the art of synthetic organic chemistry. For example, synthetic Scheme 1, set forth below, illustrates how the compounds according to the invention can be made.

Scheme 1

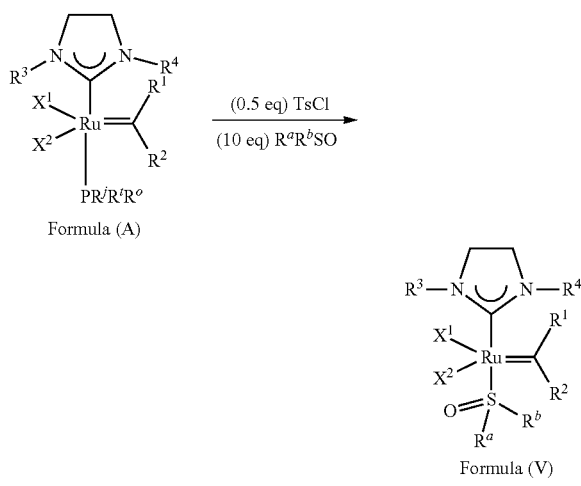

Formula (A)

Formula (V)

In a typical procedure, an olefin metathesis catalyst of general Formula (A) is reacted at room temperature with tosyl chloride (TsCl) and an excess of sulfoxide derivative ($R^aR^bSO$) to produce an olefin metathesis catalyst of general Formula (V), wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl or 2-methyl-1-propenyl; or $R^1$ and $R^2$ are linked together to form 3-phenyl-1-indenylidene;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl;

$R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2,6-di-iso-propylphenyl, 2-iso-propyl-6-methylphenyl, 2-iso-propyl-phenyl or 2-methyl-phenyl;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group; and $R^j$, $R^t$, and $R^o$ are each independently substituted $C_5$-$C_{24}$ aryl, unsubstituted $C_5$-$C_{24}$ aryl or substituted $C_1$-$C_{10}$ alkyl, unsubstituted $C_1$-$C_{10}$ alkyl; generally $R^j$, $R^t$, and $R^o$ are each independently unsubstituted $C_5$-$C_{24}$ aryl; typically $R^j$, $R^t$, and $R^o$ are each independently phenyl.

In another embodiment, the invention concerns methods of using the olefin metathesis catalysts of the invention, in the synthesis of related olefin metathesis catalysts. The ruthenium olefin metathesis catalysts bearing sulfoxide labile ligands of the invention are excellent precursors for various Second Generation Grubbs ruthenium olefin metathesis catalysts. The Second Generation Grubbs ruthenium olefin metathesis catalysts synthesized during these procedures are obtained in higher yield and with higher purity, which presents an advantage compared to the existing synthetic procedures.

For example, synthetic Scheme 2, set forth below, illustrates how olefin metathesis catalysts of Formula (F) can be synthesizing from an olefin metathesis catalyst of Formula (IV).

Scheme 2

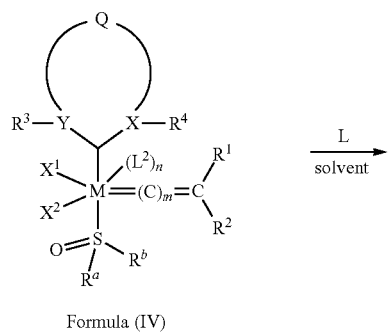

Formula (IV)

→ L, solvent

-continued

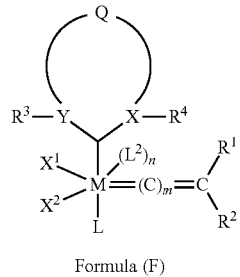

Formula (F)

In a typical procedure, as shown in Scheme 2, the sulfoxide ligand of the olefin metathesis catalyst represented by Formula (IV) can be exchanged with "L" ligand, which is a neutral electron donor. $R^1$, $R^2$, $R^3$, $R^4$, R, $X^1$, $X^2$, M, Q, n, m, $R^a$, $R^b$ and $L^2$ are as defined herein. "L" is selected from the group consisting of sulphonated phosphine, phosphite, phosphinite, phosphonite, ether, amine, carbonyl, nitrosyl, pyridine, thioether, Grubbs-Hoveyda ligands, trimethylphosphine (PMe$_3$), triethylphosphine (PEt$_3$), tri-n-butylphosphine (PBu$_3$), tri(ortho-tolyl)phosphine (P-o-tolyl$_3$), tri-tert-butylphosphine (P-tert-Bu$_3$), tricyclopentylphosphine (PCp$_3$), tricyclohexylphosphine (PCy$_3$), triisopropylphosphine (P-i-Pr$_3$), trioctylphosphine (POct$_3$), triisobutylphosphine, (P-i-Bu$_3$), triphenylphosphine (PPh$_3$), tri(pentafluorophenyl)phosphine (P(C$_6$F$_5$)$_3$), methyldiphenylphosphine (PMePh$_2$), dimethylphenylphosphine (PMe$_2$Ph), diethylphenylphosphine (PEt$_2$Ph), phosphabicycloalkane (e.g., monosubstituted 9-phosphabicyclo-[3.3.1]nonane, monosubstituted 9-phosphabicyclo[4.2.1]nonane, cyclohexylphoban, isopropylphoban, ethylphoban, methylphoban, butylphoban, pentylphoban), pyridine, 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-di-iso-propylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, carbazole, sulfur-containing heterocycles (e.g. thiophene, 1,2-dithiole, 1,3-dithiole, thiepine, benzo(b)thiophene, benzo(c)thiophene, thionaphthene, dibenzothiophene, 2H-thiopyran, 4H-thiopyran, thioanthrene), oxygen-containing heterocycles (e.g. 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, dibenzofuran), mixed (e.g. isoxazole, oxazole, thiazole, isothiazole, 1,2,3-oxadiazole, 1,2,4-oxadiazole, 1,3,4-oxadiazole, 1,2,3, 4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine), aromatic nitrogen-containing and oxygen-containing heterocycles, monocyclic N-heteroaryl ligands that are optionally substituted with 1 to 3, preferably 1 or 2, substituents.

The ligand exchange reactions are carried out under inert atmosphere (under nitrogen or argon). The reactions generally are carried out at room temperature or at temperatures from 15° C. to 25° C. or from 25° C. to 60° C., or from 35° C. to 50° C., or from 20° C. to 25° C., or from 30° C. to 40° C., or from 25° C. to 45° C. The reaction times vary from several minutes to several hours 12 hours, 24 hours or 48 hours. Generally the reactions take place in solvents such as tetrahydrofuran (THF), benzene, toluene, xylene, diethyl ether, dioxane, alcohols, methyl-tetrahydrofuran, acetone, ethyl acetate, methyl tert-butyl ether (MTBE), dimethylformamide (DMF), and dichloromethane.

In another embodiment, the invention concerns also processes for synthesizing olefin metathesis catalysts of Formula (B) starting with an olefin metathesis catalyst of Formula (V).

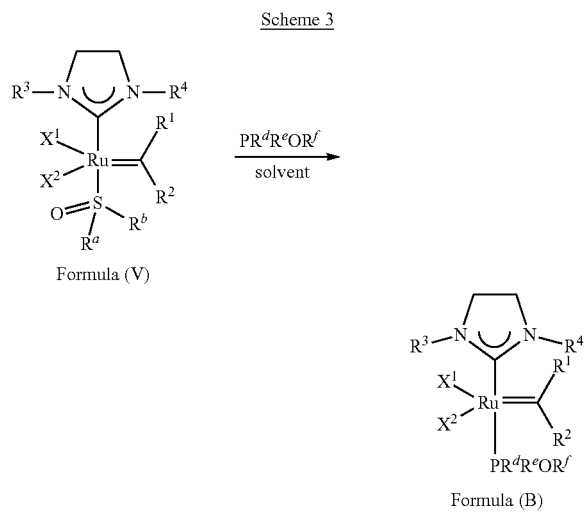

Scheme 3

Formula (V)

Formula (B)

In a typical procedure, as shown in Scheme 3, the sulfoxide ligand of the olefin metathesis catalyst represented by Formula (V) is exchanged with a $PR^dR^eOR^f$ ligand at room temperature in an inert solvent, such as dichloromethane or toluene, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl or 2-methyl-1-propenyl; or $R^1$ and $R^2$ are linked together to form 3-phenyl-1-indenylidene;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group; typically, $R^a$ and $R^b$ are linked together to form a tetrahydrothiophene oxide;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl, or 2-methyl-phenyl;

$R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2,6-di-iso-propylphenyl, 2-iso-propyl-6-methylphenyl, 2-iso-propyl-phenyl or 2-methyl-phenyl;

$R^d$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^d$ is unsubstituted $C_1$-$C_{10}$ alkyl or unsubstituted $C_6$-$C_{10}$ aryl; typically $R^d$ is phenyl;

$R^e$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^e$ is unsubstituted $C_1$-$C_{10}$ alkyl or unsubstituted $C_6$-$C_{10}$ aryl; typically $R^e$ is phenyl; and $R^f$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^f$ is unsubstituted $C_1$-$C_{10}$ alkyl, unsubstituted $C_6$-$C_{10}$ aryl or unsubstituted $C_6$-$C_{10}$ aryl; typically, $R^f$ is phenyl, methyl, p-(OMe)phenyl, iso-propyl or ethyl.

In another embodiment, the invention concerns also processes for synthesizing olefin metathesis catalysts of Formula (C) starting with an olefin metathesis catalyst of Formula (V).

Scheme 4

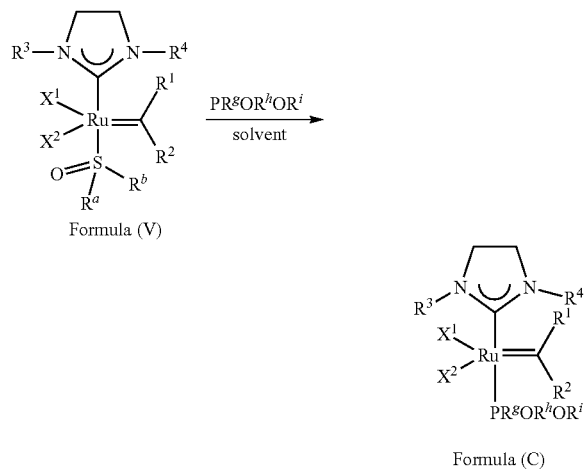

Formula (V)

Formula (C)

In a typical procedure, as shown in Scheme 4, the sulfoxide ligand of the olefin metathesis catalyst represented by Formula (V) can be exchanged with a $PR^gOR^hOR^i$ ligand at room temperature in an inert solvent, such as dichloromethane or toluene, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl or 2-methyl-1-propenyl; or $R^1$ and $R^2$ are linked together to form 3-phenyl-1-indenylidene;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group; typically, $R^a$ and $R^b$ are linked together to form a tetrahydrothiophene oxide;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl;

$R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2,6-di-iso-propylphenyl, 2-iso-propyl-6-methylphenyl, 2-iso-propyl-phenyl or 2-methyl-phenyl;

$R^g$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^g$ is unsubstituted $C_1$-$C_{10}$ alkyl or unsubstituted $C_6$-$C_{10}$ aryl; typically $R^g$ is phenyl;

$R^h$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^h$ is unsubstituted $C_1$-$C_{10}$ alkyl or unsubstituted $C_6$-$C_{10}$ aryl; typically $R^h$ is phenyl or methyl; and $R^i$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^i$ is unsubstituted $C_1$-$C_{10}$ alkyl or unsubstituted $C_6$-$C_{10}$ aryl; typically $R^i$ is phenyl or methyl.

In another embodiment, the invention concerns also processes for synthesizing olefin metathesis catalysts of Formula (D) starting with an olefin metathesis catalyst of Formula (V).

Scheme 5

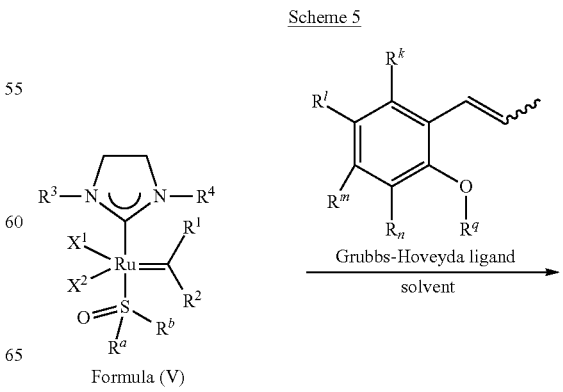

Formula (V)

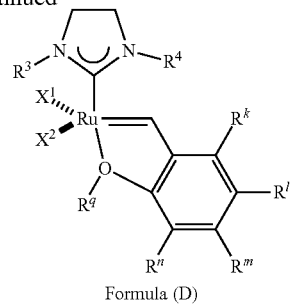

Formula (D)

In a typical procedure as shown in Scheme 5, the sulfoxide ligand of the olefin metathesis catalyst represented by Formula (V) is exchanged with a Grubbs-Hoveyda ligand at 60° C. in ethyl acetate, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl or 2-methyl-1-propenyl; or $R^1$ and $R^2$ are linked together to form 3-phenyl-1-indenylidene;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group; typically, $R^a$ and $R^b$ are linked together to form a tetrahydrothiophene oxide;

$X^1$ and $X^2$ are independently halogen, trifluoroacetate, per-fluorophenols or nitrate; generally $X^1$ and $X^2$ are independently Cl, Br, I or F; typically, $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl;

$R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2,6-di-iso-propylphenyl, 2-iso-propyl-6-methylphenyl, 2-iso-propyl-phenyl or 2-methyl-phenyl;

$R^k$ is hydrogen, halogen, $-NO_2$, $-CN$, $-CF_3$, $-SO_2NR^s{}_2$, $-NHC(O)CF_3$, $-NHC(O)C_6F_5$, $-NHC(O)OtBu$, unsubstituted hydrocarbyl, substituted hydrocarbyl, unsubstituted heteroatom-containing hydrocarbyl, or substituted heteroatom-containing hydrocarbyl; typically, $R^k$ is hydrogen;

$R^l$ is hydrogen, halogen, $-NO_2$, $-CN$, $-CF_3$, $-SO_2NR^s{}_2$, $-NHC(O)CF_3$, $-NHC(O)C_6F_5$, $-NHC(O)OtBu$, unsubstituted hydrocarbyl, substituted hydrocarbyl, unsubstituted heteroatom-containing hydrocarbyl, or substituted heteroatom-containing hydrocarbyl; typically, $R^l$ is hydrogen;

$R^m$ is hydrogen, halogen, $-NO_2$, $-CN$, $-CF_3$, $-SO_2NR^s{}_2$, $-NHC(O)CF_3$, $-NHC(O)C_6F_5$, $-NHC(O)OtBu$, unsubstituted hydrocarbyl, substituted hydrocarbyl, unsubstituted heteroatom-containing hydrocarbyl, or substituted heteroatom-containing hydrocarbyl; typically, $R^m$ is hydrogen, $-NO_2$, $-CN$, $-CF_3$, $-SO_2NR^s{}_2$, $-NHC(O)CF_3$, $-NHC(O)C_6F_5$, or $-NHC(O)OtBu$; specifically $R^m$ is hydrogen;

$R^n$ is hydrogen, halogen, $-NO_2$, $-CN$, $-CF_3$, $-SO_2NR^s{}_2$, $-NHC(O)CF_3$, $-NHC(O)C_6F_5$, $-NHC(O)OtBu$, unsubstituted hydrocarbyl, substituted hydrocarbyl, unsubstituted heteroatom-containing hydrocarbyl, or substituted heteroatom-containing hydrocarbyl; typically, $R^n$ is hydrogen;

$R^s$ is hydrogen or $C_1$-$C_6$ alkyl; typically $R^s$ is hydrogen, methyl, ethyl or n-propyl; and $R^q$ is unsubstituted hydrocarbyl, substituted hydrocarbyl; generally, $R^q$ is $C_1$-$C_{10}$ alkyl; typically, $R^q$ is iso-propyl.

In another embodiment, the invention concerns also processes for synthesizing olefin metathesis catalysts of Formula (E) starting with an olefin metathesis catalyst of Formula (V).

Scheme 6

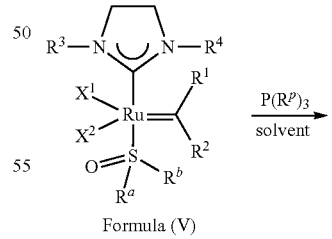

Formula (V)

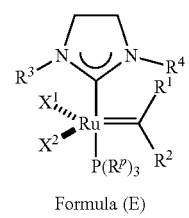

Formula (E)

In a typical procedure, as shown in Scheme 6, the sulfoxide ligand of the olefin metathesis catalyst represented by Formula (V) can be exchanged with a $P(R^q)_3$ ligand at room temperature in an inert solvent, such as dichloromethane or toluene, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl or 2-methyl-1-propenyl; or $R^1$ and $R^2$ are linked together to form 3-phenyl-1-indenylidene;

$R^a$ is hydrogen, unsubstituted hydrocarbyl, substituted hydrocarbyl, unsubstituted heteroatom-containing hydrocarbyl, or substituted heteroatom-containing hydrocarbyl; generally $R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^a$ is methyl, ethyl, n-propyl, iso-propyl, n-butyl, tert-butyl, cyclohexyl or phenyl;

$R^b$ is hydrogen, unsubstituted hydrocarbyl, substituted hydrocarbyl, unsubstituted heteroatom-containing hydrocarbyl, or substituted heteroatom-containing hydrocarbyl; generally $R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; typically $R^b$ is methyl, ethyl, n-propyl, iso-propyl, n-butyl, tert-butyl, cyclohexyl or phenyl; or $R^a$ and $R^b$ are linked together to form a five or a six heterocyclic membered ring with the sulfoxide group; typically, $R^a$ and $R^b$ are linked together to form a tetrahydrothiophene oxide;

$X^1$ and $X^2$ are independently halogen, trifluoroacetate, per-fluorophenols or nitrate; generally $X^1$ and $X^2$ are independently Cl, Br, I or F; typically $X^1$ and $X^2$ are independently Cl;

$R^3$ is unsubstituted hydrocarbyl, substituted hydrocarbyl, unsubstituted heteroatom-containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-iso-propyl-6-methylphenyl, 2-iso-propyl-phenyl or 2-methyl-phenyl;

$R^4$ is unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^4$ is 2,4,6-trimethylphenyl, 2,6-di-iso-propylphenyl, 2-iso-propyl-6-methylphenyl, 2-iso-propyl-phenyl or 2-methyl-phenyl; and $R^p$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^p$ is substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; typically $R^p$ is phenyl, cyclohexyl, or cyclopentyl.

At this stage, those skilled in the art will appreciate that many additional compounds that fall under the scope of the invention can be prepared by performing various common chemical reactions. Details of certain specific chemical transformations are provided in the examples.

The metal carbene olefin metathesis catalysts can be utilized in olefin metathesis reactions according to techniques known in the art. For example, the metal carbene olefin metathesis catalysts are typically added to a resin composition as a solid, a solution, or as a suspension. When the metal carbene olefin metathesis catalysts are added to a resin composition as a suspension, the metal carbene olefin metathesis catalysts are suspended in a dispersing carrier such as mineral oil, paraffin oil, soybean oil, tri-iso-propylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction. It will be appreciated that the amount of catalyst that is used (i.e., the "catalyst loading") in the reaction is dependent upon a variety of factors such as the identity of the reactants and the reaction conditions that are employed. It is therefore understood that catalyst loading can be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate (e.g., cyclic olefins).

Cyclic Olefins

Resin compositions that may be used with the present invention disclosed herein comprise one or more cyclic olefins. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition.

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; $C_2$-$C_{12}$ hydrocarbyl substituted norbornenes; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene; 5-tolyl-norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; bicyclo[2.2.1]hept-2-ene-2- carboxylic acid, 2-ethylhexyl ester; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxy carbonylnorbornene; endo,endo-5,6-dimethoxycarbonylnorbornene; 2,3-dimethoxynorbornene; norbornadiene; tricycloundecene; tetracyclododecene; 8-methyl tetracyclododecene; 8-ethyltetracyclododecene; 8-methoxy carbonyltetracyclo dodecene; 8-methyl-8-tetra cyclododecene; 8-cyanotetracyclo dodecene; pentacyclopentadecene; pentacyclo hexadecene; bicyclo[2.2.1]hept-2-ene-5-phenoxymethyl; 2-ethylhexyl ester-bicyclo[2.2.1]hept-5-ene-2-carboxylic acid; 2-hydroxyethyl ester-bicyclo[2.2.1]hept-5-ene-2-carboxylic acid; bicyclo[2.2.1]hept-5-ene-2-methanol; bicyclo[2.2.1]hept-5-ene-2-heptanoic acid-methyl ester; bicyclo[2.2.1]hept-5-ene-2-hexanoic acid-methyl ester; 1,4:5,8-dimethanonaphthalene, 2-hexyl-1,2,3,4,4a,5,8,8a-octahydro; bicyclo[2.2.1]hept-5-ene-2-octanoic acid-methyl ester; 1,4:5,8-dimethano naphthalene; 2-butyl-1,2,3,4,4a,5,8,8a-octahydro; ethylidenetetracyclododecene; 2-vinyl-1,2,3,4,4a,5,8,8a-octahydro-1,4:5,8-dimethano naphthalene; and the like, and their structural isomers, stereoisomers, and mixtures thereof.

EXPERIMENTAL

General Information—Materials and Methods

In the following examples, efforts have been made to ensure accuracy with respect to numbers used (e.g., amounts, temperature, etc.) but some experimental error and deviation should be accounted for. The examples are to be considered as not being limiting of the invention described herein. Surprisingly, the olefin metathesis catalysts of the invention were obtained only in the cis configuration, no traces of the trans stereoisomers were detected.

All reactions involving metal complexes were conducted in oven-dried glassware under an argon or nitrogen atmosphere using standard Schlenk techniques. Chemicals and solvents were obtained from Sigma-Aldrich, Strem, Alfa Aesar, Nexeo, Brenntag, AG Layne and TCI. Commercially available reagents were used as received unless otherwise noted. Silica gel was purchased from Fisher (0.040-0.063 µm, EMD Millipore).

The crystallographic measurements were performed at 100(2) K using a Bruker APEX-II CCD area detector diffractometer (Mo—$K_\alpha$ radiation, $\lambda$=0.71073 Å). In each case, a specimen of suitable size and quality was selected and mounted onto a nylon loop. The structures were solved by direct methods, which successfully located most of the non-hydrogen atoms. Semi-empirical absorption corrections were applied. Subsequent refinement on $F^2$ using the SHELXTL/PC package (version 6.1) allowed location of the remaining non-hydrogen atoms.

Ultrene® 99 dicyclopentadiene (DCPD) was obtained from Cymetech Corporation. A modified DCPD base resin containing 20-25% tricyclopentadiene (and small amounts of higher cyclopentadiene homologs) (DCPD-HT) was prepared by heat treatment of Ultrene® 99 DCPD generally as described in U.S. Pat. No. 4,899,005.

Catalysts C931, C933, C793, C827, C705, C727, C748 and C848 were prepared using known methods.

$^1$H and $^{13}$C NMR spectra were recorded on a Varian 400 MHz spectrometer. Chemical shifts are reported in ppm downfield from Me$_4$Si by using the residual solvent peak as an internal standard (CDCl$_3$ δ 7.24 ppm). Spectra were analyzed and processed using MestReNova software.

General GC method conditions: injection temperature, 250° C.; detector temperature, 280° C.; oven temperature, starting temperature, 100° C.; hold time, 1 min. The ramp rate was 10° C./min to 250° C., hold time 12 min; carrier gas helium.

GC Method 1: Column: DB-225, 30 m×0.25 mm (ID)× 0.25 µm film thickness. Manufacturer: Agilent; GC and column conditions: Injector temperature: 220° C., Detector temperature: 220° C.; Oven temperature: Starting temperature: 35° C., hold time: 0.5 minutes.

Ramp rate 10° C./min to 130° C., hold time: 0 minutes. Ramp rate 20° C./min to 220° C., hold time: 5 minutes. Carrier gas: Helium. Mean gas velocity: 25 cm/sec. Split ratio: 20:1.

The following abbreviations are used in the examples:

mL milliliter

DCM/CH$_2$Cl$_2$ dichloromethane

C$_6$D$_6$ deuterated benzene

CDCl$_3$ deuterated chloroform

CD$_2$Cl$_2$ deuterated dichloromethane

C931

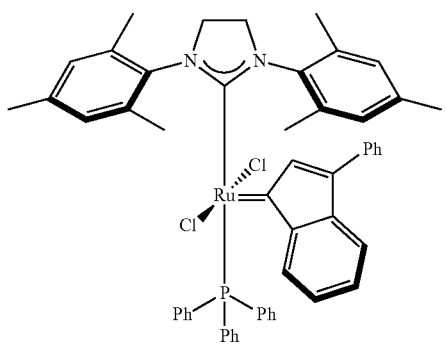

[1,3-bis-(2,4,6-trimethylphenyl)-2-imidazolidinylidene] dichloro (phenylindenylidene) (triphenylphosphine)ruthenium(II) [CAS 340810-50-6]

C793

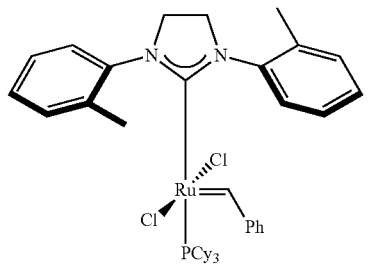

[1,3-Bis(2-methylphenyl)-2-imidazolidinylidene]dichloro(benzylidene) (tricyclohexylphosphine)ruthenium(II) [CAS 927429-60-5]
C827

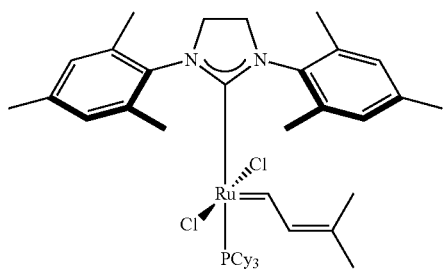

Dichloro[1,3-bis(2,4,6-trimethylphenyl)-2-imidazolidinylidene](3-methyl-2-butenylidene) (tricyclohexylphosphine)ruthenium(II) [CAS 253688-91-4]
C933

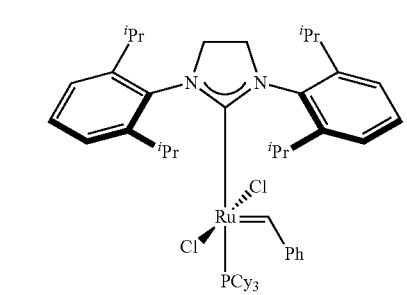

Dichloro[1,3-bis(2,6-di-iso-propylphenyl)-2-imidazolidinylidene](benzylidene)(tricyclohexylphosphine) ruthenium(II) [CAS 373640-75-6]
C848

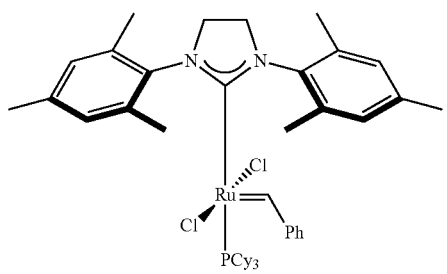

Dichloro[1,3-bis(2,4,6-trimethylphenyl)-2-imidazolidinylidene](benzylidene)(tricyclohexylphosphine) ruthenium(II) [CAS 246047-72-3]
C748

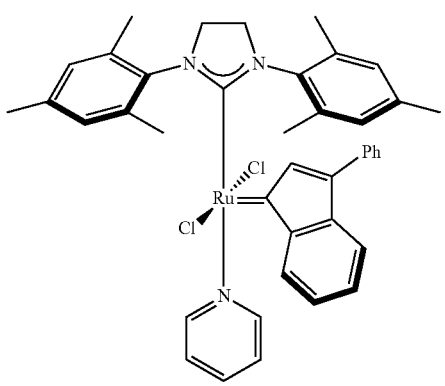

[1,3-Bis(2,4,6-trimethylphenyl)-2-imidazolidinylidene]dichloro-(3-phenyl-1H-inden-1-ylidene)(pyridyl)ruthenium (II) [CAS 1031262-76-6]
C727

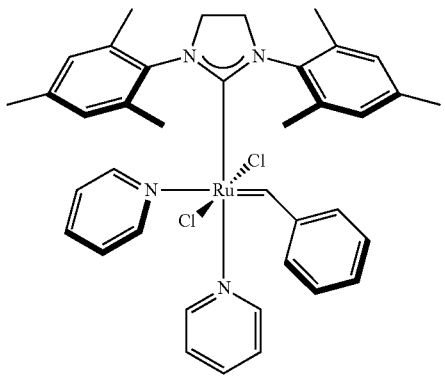

Dichloro[1,3-bis(2,4,6-trimethylphenyl)-2-imidazolidinylidene](benzylidene)(dipyridine) ruthenium(II) [CAS 357186-58-4]
C705

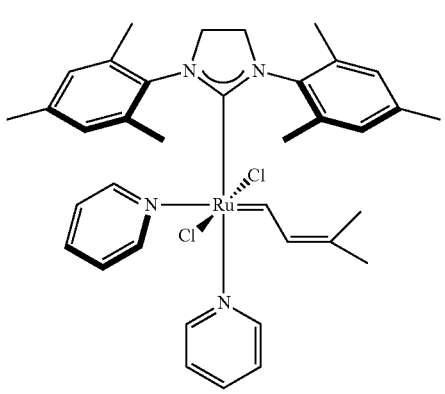

Dichloro[1,3-bis(2,4,6-trimethylphenyl)-2-imidazolidi-nylidene](3-methyl-2-butenylidene)(dipyridine)ruthenium(II) [CAS 507274-22-8]
DMSO dimethylsulfoxide
PCy₃ tricyclohexylphosphine
EtOAc ethylacetate
MTBE methyl tert-butyl ether
THF tetrahydrofuran
CHP cumene hydroperoxide
5C14 5-tetradecene
5C10 5-decene
9C18 9-octadecene

EXAMPLES

Example 1

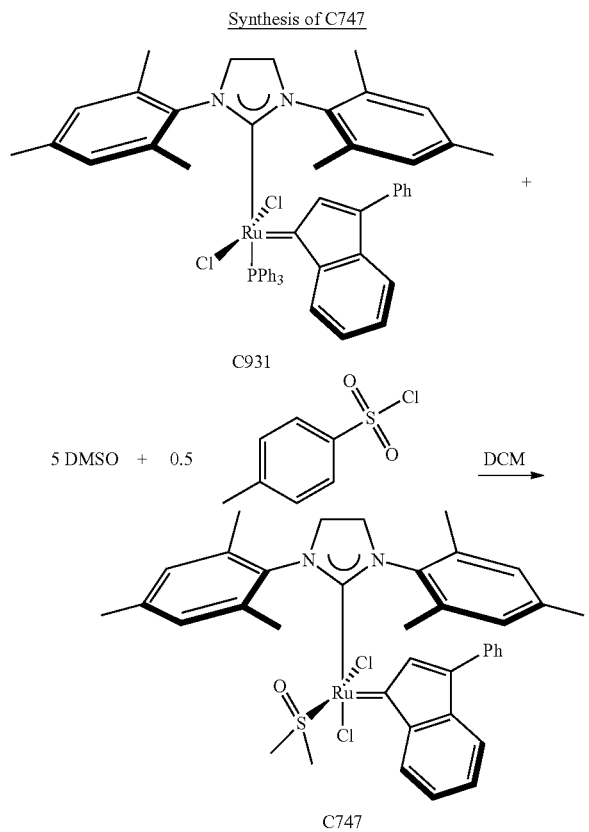

C931

C747

To a 20 mL scintillation vial equipped with a magnetic stir bar were added C931 (0.500 g, 0.537 mmol), p-toluenesulfonyl chloride (0.051 g, 0.268 mmol), dimethyl sulfoxide (0.210 g, 2.68 mmol), and dichloromethane (4 mL). The reaction was stirred for one hour then filtered through a plug of celite and combined with diethyl ether (30 mL). The resulting black precipitate was isolated by filtration, washed with diethyl ether (2×10 mL) then dried in vacuum to afford C747 as a black powder (0.346 g, 86.3% yield). The X-ray structure of C747 is shown in FIG. 1.

¹H NMR (400 MHz, CDCl₃): δ 8.68 (d, J=7.4 Hz, 1H), 7.71 (d, J=7.6 Hz, 2H), 7.52 (t, J=7.1 Hz, 1H), 7.42 (t, J=7.5 Hz, 2H), 7.31 (t, J=7.4 Hz, 1H), 7.25 (t, J=7.1 Hz, 1H), 7.11 (d, J=6.1 Hz, 2H), 7.04 (d, J=7.0 Hz, 1H), 6.86 (s, 1H), 6.26 (d, J=3.8 Hz, 2H), 4.13-3.99 (m, 1H), 3.99-3.80 (m, 2H), 3.80-3.69 (m, 1H), 2.82 (s, 3H), 2.69 (s, 3H), 2.68 (s, 3H), 2.41 (s, 3H), 2.35 (s, 3H), 2.11 (s, 3H), 2.05 (s, 3H), 1.77 (s, 3H).

Example 2

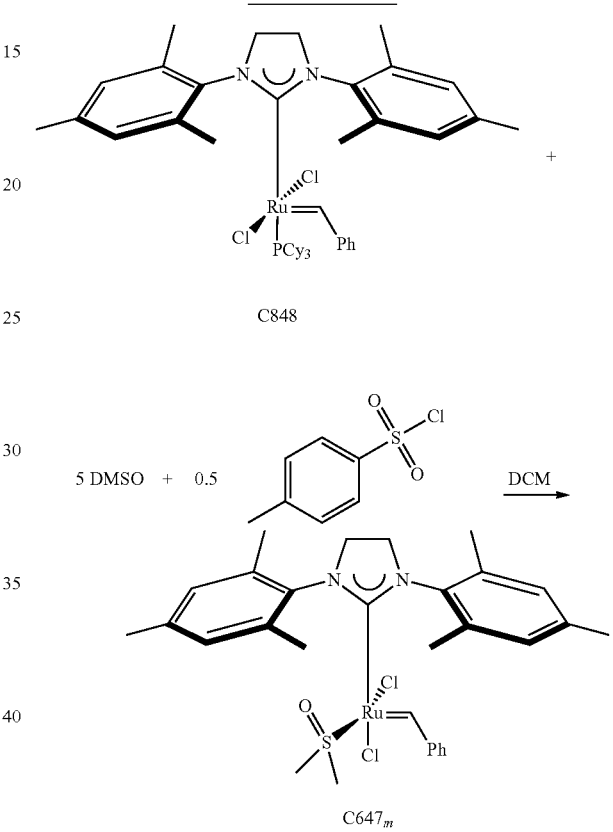

C848

C647ₘ

Figure 2:
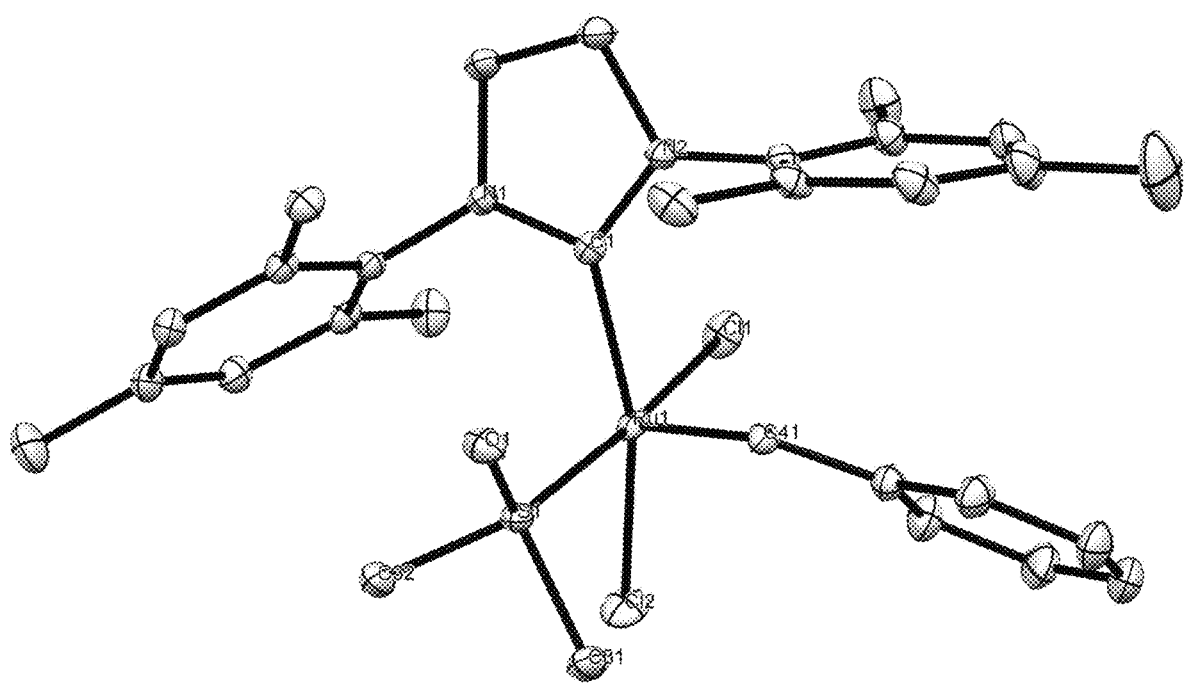
FIG. 2. Oak Ridge Thermal Ellipsoid Plot (ORTEP) diagram of $C647_m$.

To a 40 mL scintillation vial equipped with a magnetic stir bar were added C848 (0.500 g, 0.589 mmol), p-toluenesulfonyl chloride (0.056 g, 0.30 mmol), dimethyl sulfoxide (0.230 g, 2.94 mmol), and dichloromethane (4 mL). The reaction was stirred at ambient temperature for one hour then filtered through a plug of celite and combined with diethyl ether (30 mL). The resulting purple precipitate was isolated by filtration, washed with diethyl ether (2×10 mL) then dried in vacuum to afford C647ₘ as a purple crystalline solid (0.269 g, 70.7% yield). The X-ray structure of C647ₘ is shown in FIG. 2.

¹H NMR (400 MHz, C₆D₆) δ 16.03 (s, 1H), 8.15 (d, J=25.0 Hz, 2H), 7.21 (t, J=7.3 Hz, 1H), 7.00 (t, J=7.8 Hz, 2H), 6.84 (s, 1H), 6.75 (s, 1H), 6.65 (s, 1H), 6.17 (s, 1H), 3.33-3.00 (m, 4H), 2.87 (s, 3H), 2.67 (s, 3H), 2.61 (s, 3H), 2.22 (s, 3H), 2.14 (s, 3H), 2.07 (s, 3H), 2.04 (s, 3H), 1.98 (s, 3H).

Example 3

Synthesis of C731

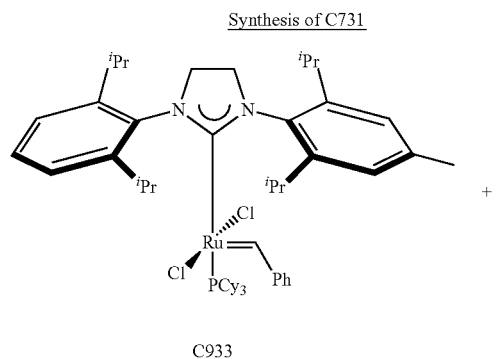

Example 4

Synthesis of C591

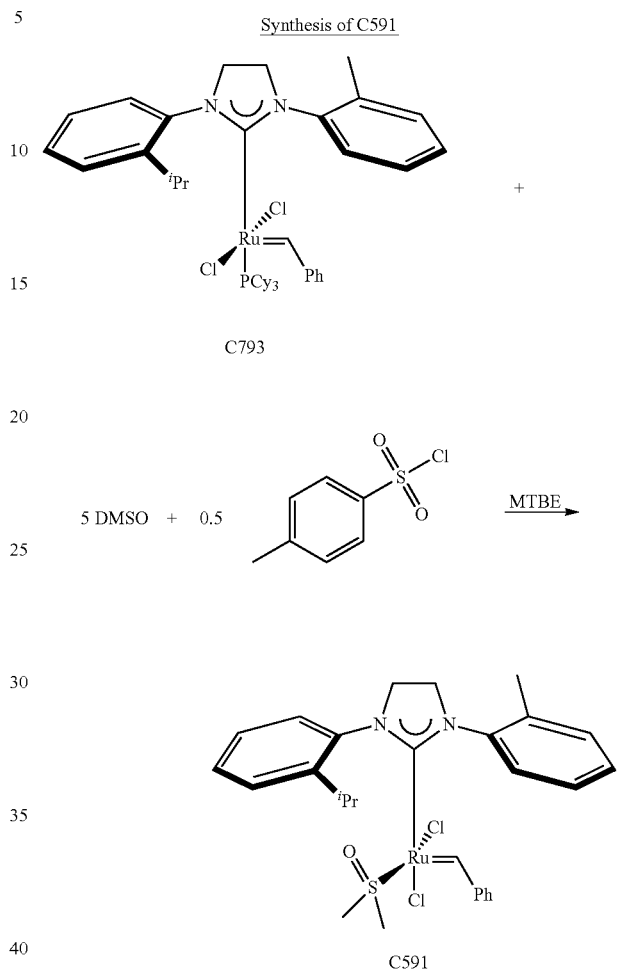

To a 40 mL scintillation vial equipped with a magnetic stir bar were added C933 (0.500 g, 0.536 mmol), p-toluene-sulfonyl chloride (0.051 g, 0.27 mmol), dimethyl sulfoxide (0.209 g, 2.68 mmol), and ethyl acetate (10 mL). The reaction was stirred at ambient temperature for three hours affording a fine blue-gray precipitate. The solid was isolated by filtration, washed with ethyl acetate (2×5 mL) then dried in vacuum to afford C731 as a blue-gray solid (0.148 g, 37.8% yield).

$^1$H NMR (400 MHz, C$_6$D$_6$): δ 16.16 (s, 1H), 7.99 (s, 2H), 7.31-7.01 (m, 6H), 6.94 (t, J=7.2 Hz, 2H), 6.65 (d, J=7.2 Hz, 1H), 4.63-4.48 (m, 1H), 4.07-3.92 (m, 1H), 3.76-3.60 (m, 2H), 3.60-3.44 (m, 3H), 3.42-3.27 (m, 1H), 1.97 (s, 3H), 1.87 (d, J=6.0 Hz, 3H), 1.72 (s, 3H), 1.67 (d, J=6.7 Hz, 3H), 1.65 (d, J=6.8 Hz, 3H), 1.20 (d, J=6.3 Hz, 3H), 1.12 (d, J=6.3 Hz, 3H), 1.04 (d, J=6.1 Hz, 3H), 0.88 (d, J=6.5 Hz, 3H), 0.77 (d, J=5.7 Hz, 3H).

To a 40 mL scintillation vial equipped with a magnetic stir bar were added C793 (0.500 g, 0.631 mmol), p-toluene-sulfonyl chloride (0.060 g, 0.32 mmol), dimethyl sulfoxide (0.246 g, 3.15 mmol), and methyl tert-butyl ether (10 mL). The reaction was stirred at ambient temperature for four hours affording a purple precipitate. The solid was isolated by filtration then recrystallized from dichloromethane and diethyl ether. The resulting purple crystals were isolated by filtration, washed with diethyl ether (2×5 mL) then dried in vacuum to afford C591 as a purple crystalline solid (0.234 g, 62.7% yield). Two isomers [87:13], which are not stereoisomers, were observed in solution.

$^1$H NMR (400 MHz, CD$_2$Cl$_2$, major isomer) δ 15.82 (s, 1H), 8.72 (d, J=7.7 Hz, 1H), 7.78 (d, J=7.5 Hz, 2H), 7.56 (dd, J=16.6, 8.1 Hz, 2H), 7.52-7.39 (m, 2H), 7.24 (t, J=7.9 Hz, 3H), 7.15 (d, J=7.9 Hz, 1H), 6.96 (t, J=7.5 Hz, 1H), 6.45 (t, J=7.6 Hz, 1H), 4.59-4.47 (m, 1H), 4.22 (q, J=10.1 Hz, 1H), 3.90 (q, J=10.4 Hz, 1H), 3.83-3.72 (m, 1H), 2.67 (s, 3H), 2.59 (s, 3H), 2.29 (s, 3H), 1.90 (s, 3H).

$^1$H NMR (400 MHz, CD$_2$Cl$_2$, minor isomer, selected resonances) δ 16.02 (s, 1H), 8.91 (d, J=7.7 Hz, 1H), 7.73 (d, J=7.6 Hz, 1H), 6.90-6.84 (m, 1H), 4.43-4.34 (m, 1H), 2.40 (s, 3H), 2.01 (s, 3H), 1.96 (s, 3H).

Example 5

Synthesis of C625

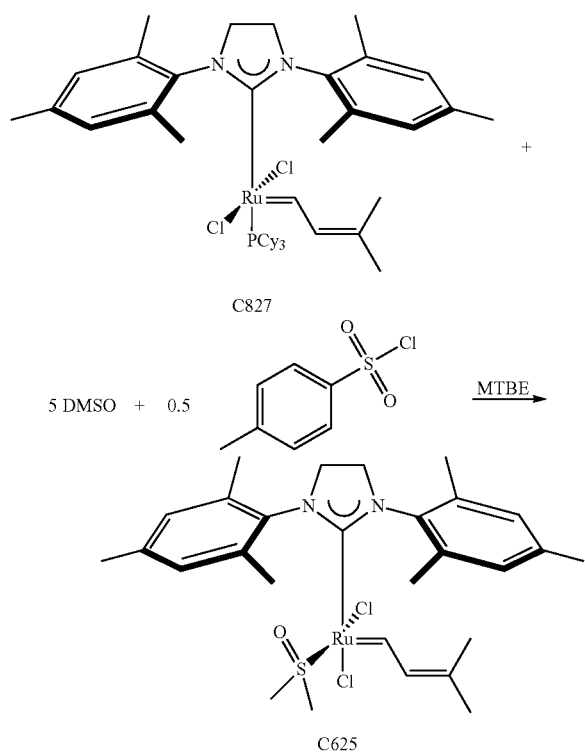

To a 40 mL scintillation vial equipped with a magnetic stir bar were added C827 (0.500 g, 0.605 mmol), p-toluenesulfonyl chloride (0.058 g, 0.30 mmol), dimethyl sulfoxide (0.236 g, 3.02 mmol), and methyl tert-butyl ether (10 mL). The reaction was stirred at ambient temperature for twenty four hours and the resulting brown precipitate was isolated by filtration, washed with methyl tert-butyl ether (2×10 mL) then dried in vacuum to afford C625 as a light brown solid (0.298 g, 78.8% yield).

$^1$H NMR (400 MHz, CDCl$_3$) δ 16.10 (d, J=11.3 Hz, 1H), 7.83 (d, J=11.2 Hz, 1H), 7.08 (s, 1H), 7.05 (s, 1H), 6.82 (s, 1H), 6.73 (s, 1H), 4.13-4.00 (m, 1H), 4.00-3.78 (m, 3H), 2.73 (s, 6H), 2.55 (s, 3H), 2.54 (s, 3H), 2.38 (s, 3H), 2.32 (s, 3H), 2.22 (s, 6H), 1.33 (s, 3H), 1.27 (s, 3H).

Example 6

Synthesis of C865

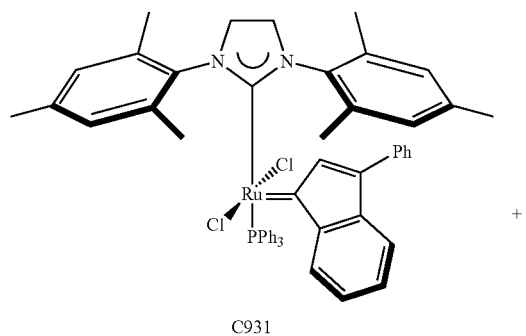

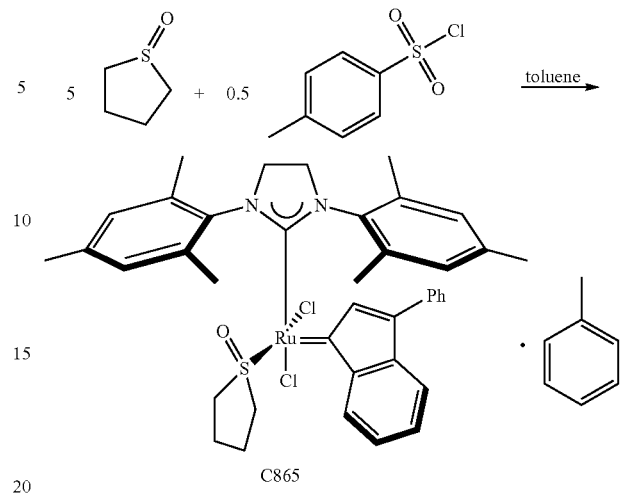

To a 40 mL scintillation vial equipped with a magnetic stir bar was added C931 (0.500 g, 0.537 mmol), p-toluenesulfonyl chloride (0.051 g, 0.27 mmol), tetrahydrothiophene 1-oxide (0.279 g, 2.68 mmol), and toluene (5 mL). The reaction was stirred at ambient temperature for two hours then diluted with diethyl ether (15 mL). The precipitate was isolated by filtration, washed with diethyl ether (2×20 mL) followed by hexanes (1×20 mL) then dried in vacuum to afford C865 (0.418 g, 90.0% yield).

$^1$H NMR (400 MHz, CDCl$_3$) δ 8.72 (d, J=7.2 Hz, 1H), 7.71 (d, J=7.7 Hz, 2H), 7.52 (t, J=7.3 Hz, 1H), 7.42 (t, J=7.5 Hz, 2H), 7.33-7.20 (m, 4H), 7.20-7.14 (m, 3H), 7.11 (d, J=8.9 Hz, 2H), 7.04 (d, J=7.0 Hz, 1H), 6.93 (s, 1H), 6.28 (s, 2H), 4.15-4.03 (m, 1H), 4.03-3.86 (m, 2H), 3.84-3.71 (m, 1H), 2.92-2.85 (m, 2H), 2.84 (s, 3H), 2.69 (s, 3H), 2.70-2.60 (m, 1H), 2.43 (s, 3H), 2.36 (s, 3H), 2.35 (s, 3H), 2.09 (s, 3H), 2.15-2.04 (m, 1H), 2.04-1.90 (m, 2H), 1.78 (s, 3H), 1.82-1.73 (m, 2H).

Example 7

Synthesis of C861

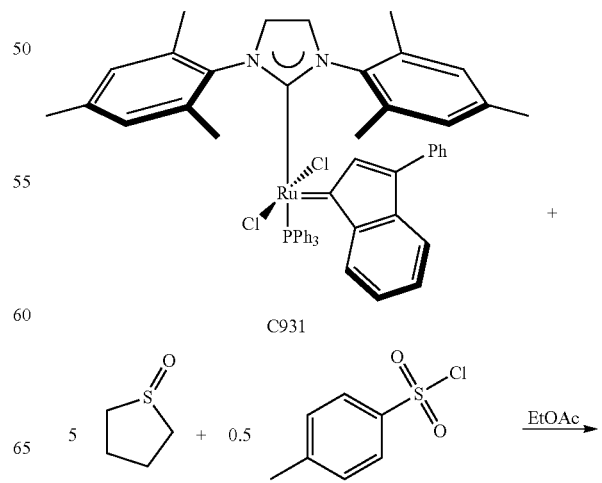

97
-continued

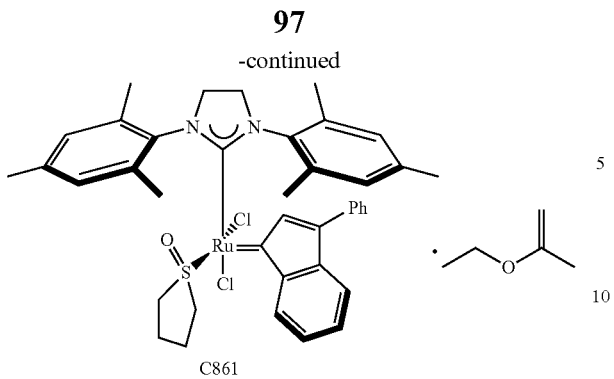

C861

To a 40 mL scintillation vial equipped with a magnetic stir bar was added C931 (0.500 g, 0.537 mmol), p-toluenesulfonyl chloride (0.051 g, 0.27 mmol), tetrahydrothiophene 1-oxide (0.279 g, 2.68 mmol), and ethyl acetate (5 mL). The reaction was stirred at ambient temperature for three hours then diluted with diethyl ether (25 mL). The precipitate was isolated by filtration, washed with diethyl ether (2×10 mL) followed by hexanes (1×20 mL) then dried in vacuum to afford C861 (0.386 g, 83.5% yield).

$^1$H NMR (400 MHz, CDCl$_3$) δ 8.71 (d, J=7.2 Hz, 1H), 7.70 (d, J=7.7 Hz, 2H), 7.51 (t, J=7.2 Hz, 1H), 7.41 (t, J=7.4 Hz, 2H), 7.33-7.19 (m, 2H), 7.11 (d, J=8.1 Hz, 2H), 7.03 (d, J=7.1 Hz, 1H), 6.92 (s, 1H), 6.27 (s, 2H), 4.11 (dd, J=14.3, 7.1 Hz, 2H), 4.15-4.02 (m, 1H), 4.03-3.85 (m, 2H), 3.84-3.71 (m, 1H), 2.92-2.79 (m, 2H), 2.83 (s, 3H), 2.68 (s, 3H), 2.70-2.59 (m, 1H), 2.42 (s, 3H), 2.35 (s, 3H), 2.08 (s, 3H), 2.15-2.07 (m, 1H), 2.03 (s, 3H), 2.02-1.90 (m, 2H), 1.77 (s, 3H), 1.82-1.73 (m, 2H), 1.25 (t, J=7.1 Hz, 3H).

Example 8

Synthesis of C773

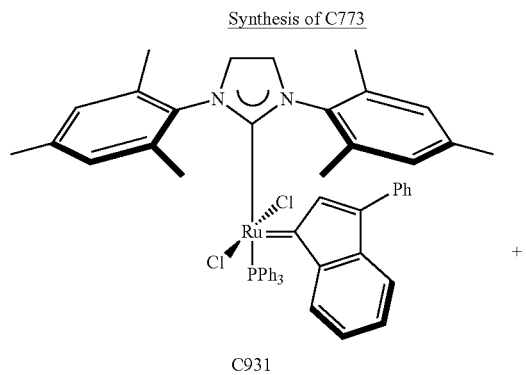

C931

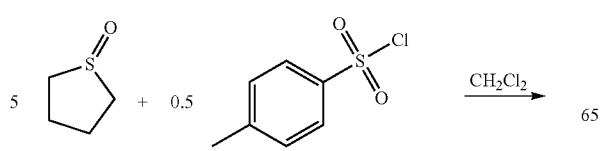

98
-continued

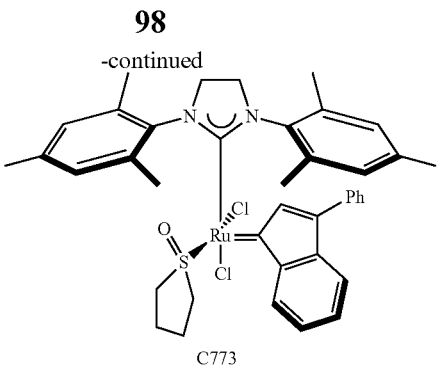

C773

To a 40 mL scintillation vial equipped with a magnetic stir bar was added C931 (0.500 g, 0.537 mmol), p-toluenesulfonyl chloride (0.051 g, 0.27 mmol), tetrahydrothiophene 1-oxide (0.279 g, 2.68 mmol), and dichloromethane (4 mL). The reaction was stirred at ambient temperature for three hours then diluted with diethyl ether (30 mL). The precipitate was isolated by filtration, washed with diethyl ether (2×10 mL) followed by hexanes (1×20 mL) then dried in vacuum to afford C773 (0.345 g, 83.0% yield).

$^1$H NMR (400 MHz, CDCl$_3$) δ 8.71 (d, J=7.1 Hz, 1H), 7.71 (d, J=7.6 Hz, 2H), 7.52 (t, J=7.1 Hz, 1H), 7.42 (t, J=7.4 Hz, 2H), 7.34-7.19 (m, 2H), 7.11 (d, J=8.0 Hz, 2H), 7.03 (d, J=7.0 Hz, 1H), 6.92 (s, 1H), 6.28 (s, 2H), 4.14-4.03 (m, 1H), 4.03-3.86 (m, 2H), 3.82-3.72 (m, 1H), 2.83 (s, 3H), 2.91-2.79 (m, 2H), 2.69 (s, 3H), 2.72-2.60 (m, 1H), 2.42 (s, 3H), 2.36 (s, 3H), 2.18-2.04 (m, 1H), 2.08 (s, 3H). 2.04-1.88 (m, 2H), 1.77 (s, 3H), 1.82-1.73 (m, 2H).

Example 9

Synthesis of C673

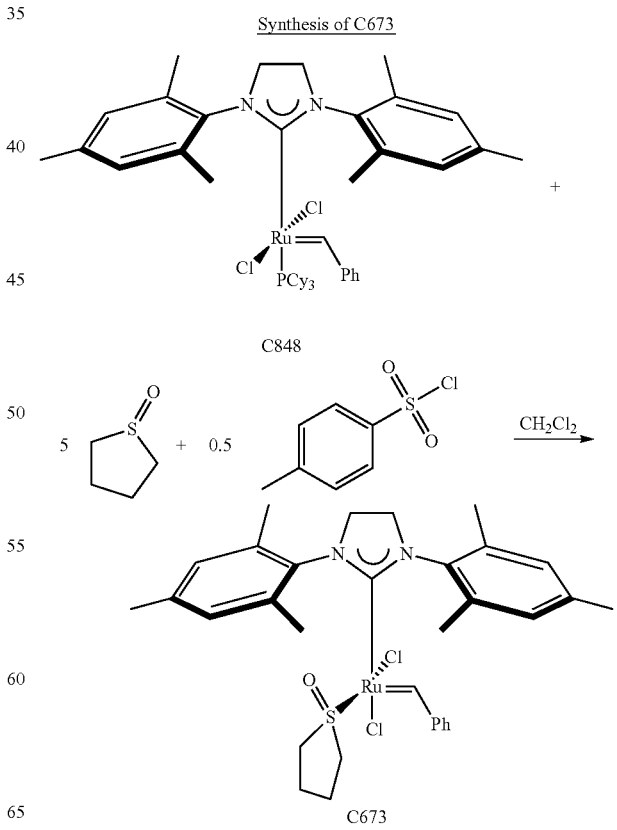

To a 40 mL scintillation vial equipped with a magnetic stir bar was added C848 (0.500 g, 0.589 mmol), p-toluenesulfonyl chloride (0.056 g, 0.30 mmol), tetrahydrothiophene 1-oxide (0.307 g, 2.94 mmol), and dichloromethane (4 mL). The reaction was stirred at ambient temperature for one hour then diluted with diethyl ether (25 mL). The precipitate was isolated by filtration, washed with diethyl ether (2×10 mL) followed by hexanes (1×15 mL) then dried in vacuum to afford C673 (0.248 g, 62.6% yield).

$^1$H NMR (400 MHz, CDCl$_3$) δ 16.12 (s, 1H), 7.82 (d, J=7.7 Hz, 2H), 7.55 (t, J=7.2 Hz, 1H), 7.23 (t, J=7.7 Hz, 2H), 7.11 (br s, 2H), 6.93 (s, 1H), 6.29 (s, 1H), 4.11-3.94 (m, 3H), 3.86-3.76 (m, 1H), 2.72 (s, 3H), 2.69 (s, 3H), 2.64 (s, 3H), 2.62-2.45 (m, 3H), 2.35 (s, 3H), 2.27-2.17 (m, 1H), 2.15 (s, 3H), 2.07 (s, 3H), 2.05-1.91 (m, 2H), 1.84-1.68 (m, 2H).

Example 10

Synthesis of C651

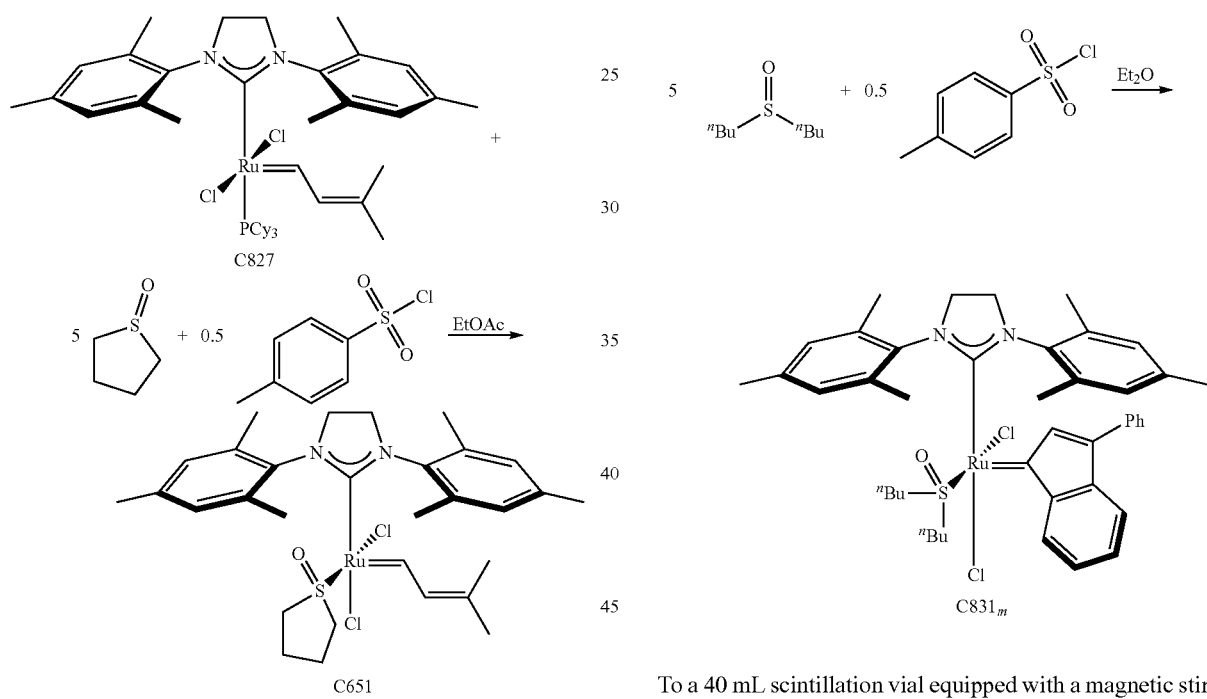

To a 40 mL scintillation vial equipped with a magnetic stir bar was added C827 (0.500 g, 0.605 mmol), p-toluenesulfonyl chloride (0.058 g, 0.30 mmol), tetrahydrothiophene 1-oxide (0.315 g, 3.02 mmol), and ethyl acetate (5 mL). The reaction was stirred at ambient temperature for 16 hours. The precipitate was isolated by filtration and recrystallized from dichloromethane/methanol at −30° C. The resulting purple crystalline product was isolated by filtration, washed with dichloromethane/methanol (1:10, 2×5 mL) then dried in vacuum to afford C651 (0.141 g, 35.7% yield).

$^1$H NMR (400 MHz, CDCl$_3$) δ 16.73 (d, J=11.3 Hz, 1H), 7.66 (d, J=11.5 Hz, 1H), 7.09 (s, 1H), 7.05 (s, 1H), 6.83 (s, 1H), 6.71 (s, 1H), 4.17-4.02 (m, 1H), 4.01-3.84 (m, 3H), 3.16-3.06 (m, 1H), 3.02-2.89 (m, 1H), 2.85-2.74 (m, 2H), 2.75 (s, 3H), 2.59 (s, 3H), 2.54 (s, 3H), 2.33 (s, 6H), 2.22 (s, 3H), 2.14-2.02 (m, 2H), 1.99-1.83 (m, 2H), 1.34 (s, 3H), 1.26 (s, 3H).

Example 11

Synthesis of C831$_m$

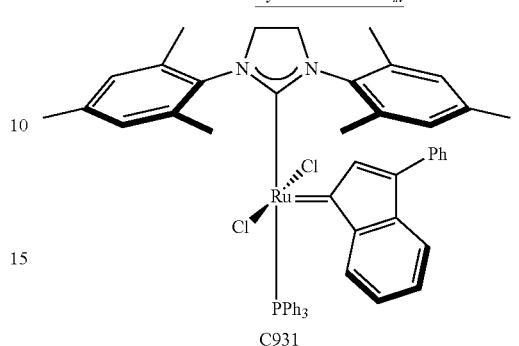

To a 40 mL scintillation vial equipped with a magnetic stir bar was added C931 (0.500 g, 0.537 mmol), p-toluenesulfonyl chloride (0.051 g, 0.27 mmol), dibutyl sulfoxide (0.436 g, 2.69 mmol), and diethyl ether (10 mL). The reaction was stirred at ambient temperature for twelve hours. The precipitate was isolated by filtration, washed with diethyl ether (1×10 mL) followed by hexanes (1×20 mL) then dried in vacuum to afford C831$_m$ (0.195 g, 43.7% yield).

$^1$H NMR (400 MHz, CD$_2$Cl$_2$) δ 8.68-8.60 (m, 1H), 7.77-7.69 (m, 2H), 7.57-7.50 (m, 1H), 7.44 (t, J=7.5 Hz, 2H), 7.35-7.28 (m, 2H), 7.15 (s, 1H), 7.13 (dd, J=5.6, 2.7 Hz, 1H), 7.07 (s, 1H), 6.77 (s, 1H), 6.36 (s, 1H), 6.21 (s, 1H), 4.06-3.95 (m, 1H), 3.94-3.81 (m, 2H), 3.78-3.65 (m, 1H), 2.94 (ddd, J=14.5, 12.3, 5.6 Hz, 1H), 2.77 (s, 3H), 2.70 (s, 3H), 2.64-2.51 (m, 1H), 2.47 (s, 3H), 2.36 (s, 3H), 1.95 (s, 3H), 1.73 (s, 3H), 1.71-1.60 (m, 1H), 1.60-1.43 (m, 2H), 1.33-1.19 (m, 2H), 1.19-1.03 (m, 2H), 0.98-0.91 (m, 2H), 0.88 (t, J=7.2 Hz, 3H), 0.83-0.70 (m, 1H), 0.48 (t, J=7.3 Hz, 3H).

Example 12

Synthesis of C885$_{ss}$

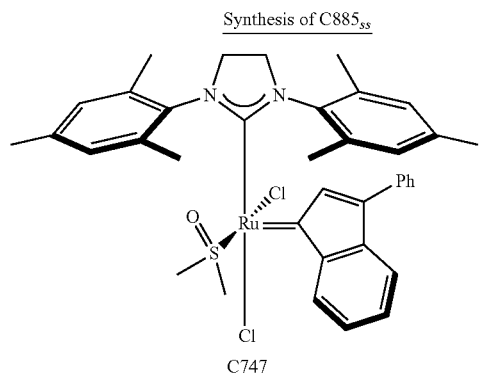

C747

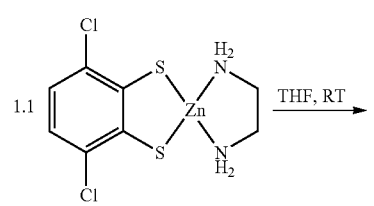

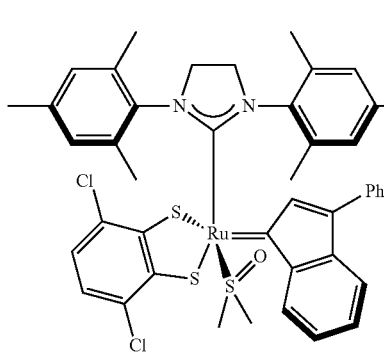

C885$_{ss}$

To a 40 mL scintillation vial equipped with a magnetic stir bar was added C747 (0.590 g, 0.790 mmol), (3,6-dichlorobenzene-1,2-dithiolato)(ethylenediamine)zinc(II) (0.291 g, 0.869 mmol), and tetrahydrofuran (8 mL). The reaction was stirred at ambient temperature for one hour then concentrated to dryness. The resulting residue was extracted with dichloromethane (10 mL), filtered through a plug of celite, and then concentrated in vacuum to about 5 mL. Slow addition of hexanes (30 mL) with rapid stirring afforded a precipitate that was isolated by filtration, washed with hexanes (2×10 mL) then dried in vacuum to afford C885$_{ss}$ (0.604 g, 86.4% yield) as a dark purple powder.

$^1$H NMR (400 MHz, CD$_2$Cl$_2$) δ 7.76 (d, J=7.3 Hz, 2H), 7.55-7.40 (m, 3H), 7.31 (br s, 1H), 7.20 (br s, 1H), 7.12 (br s, 1H), 7.04 (t, J=7.3 Hz, 2H), 6.97 (d, J=6.7 Hz, 1H), 6.84 (br s, 1H), 6.74 (t, J=7.2 Hz, 1H), 6.31 (d, J=7.6 Hz, 2H), 6.19 (br s, 1H), 4.03 (br s, 1H), 3.92 (br s, 3H), 2.90 (br s, 3H), 2.64 (br s, 3H), 2.43 (br s, 6H), 2.26 (br s, 6H), 2.18 (br s, 3H), 1.78 (br s, 3H).

Example 13

Synthesis of C785$_{ss}$

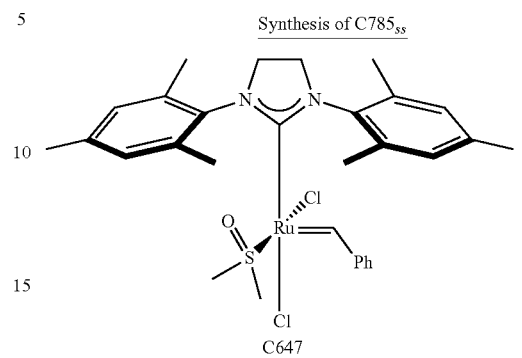

C647

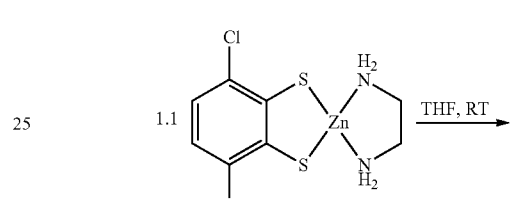

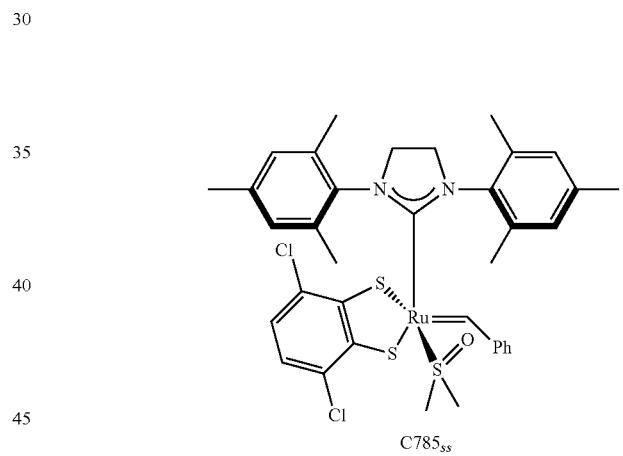

C785$_{ss}$

To a 40 mL scintillation vial equipped with a magnetic stir bar was added C647 (0.300 g, 0.464 mmol), (3,6-dichlorobenzene-1,2-dithiolato)(ethylenediamine) zinc(II) (0.171 g, 0.510 mmol), and tetrahydrofuran (5 mL). The reaction was stirred at ambient temperature for thirty minutes then concentrated to dryness. The resulting residue was extracted with dichloromethane (20 mL), passed through a 0.2 μm syringe filter, and then concentrated in vacuum to ca. 4 mL. Diethyl ether (30 mL) was added slowly affording a green microcrystalline precipitate. The product was isolated by filtration, washed with diethyl ether (2×5 mL) and dried in vacuum to afford C785$_{ss}$ (0.283 g, 77.8% yield).

$^1$H NMR (400 MHz, CD$_2$Cl$_2$) δ 14.77 (s, 1H), 7.28 (t, J=7.3 Hz, 1H), 7.18 (d, J=8.1 Hz, 1H), 7.10 (d, J=8.2 Hz, 1H), 7.06 (s, 1H), 6.90-6.81 (m, 4H), 6.47 (d, J=7.3 Hz, 2H), 6.23 (s, 1H), 4.10-3.90 (m, 4H), 2.71 (s, 3H), 2.68 (s, 3H), 2.66 (s, 3H), 2.35 (s, 3H), 2.30 (s, 3H), 2.28 (s, 3H), 2.21 (s, 3H), 2.02 (s, 3H).

Synthesis of Second Generation Grubbs Ruthenium Olefin Metathesis Catalysts

Example 14

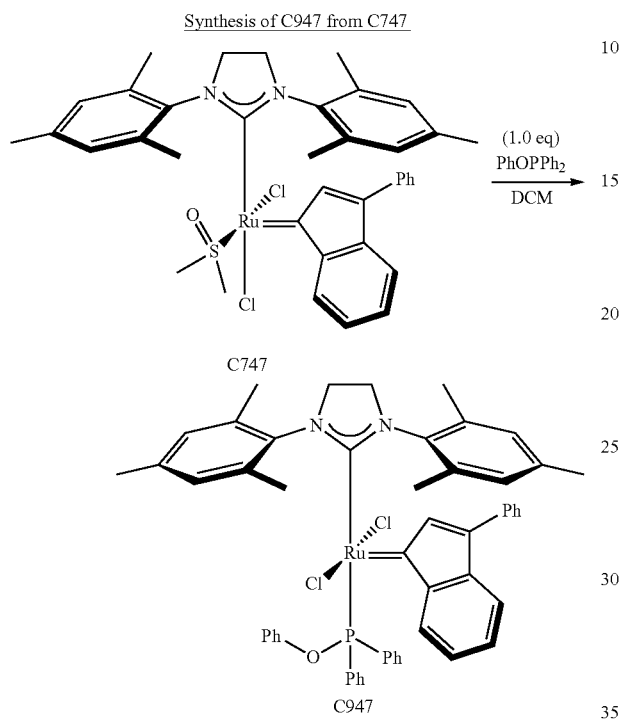

To a 20 mL scintillation vial equipped with a magnetic stir bar were added C747 (0.500 g, 0.670 mmol), (PhO)PPh$_2$ ([CAS 13360-92-4] 0.196 g, 0.703 mmol), and dichloromethane (5 mL). The reaction was stirred at ambient temperature for one hour then concentrated to 1 mL under vacuum. Hexanes (14 mL) was added and the resulting precipitate was isolated by filtration, washed with hexanes (2×10 mL) then dried in vacuum to afford C947 as a red-brown powder (0.599 g, 94.5% yield). The $^1$H NMR data correspond to the data found in the literature.

Example 15

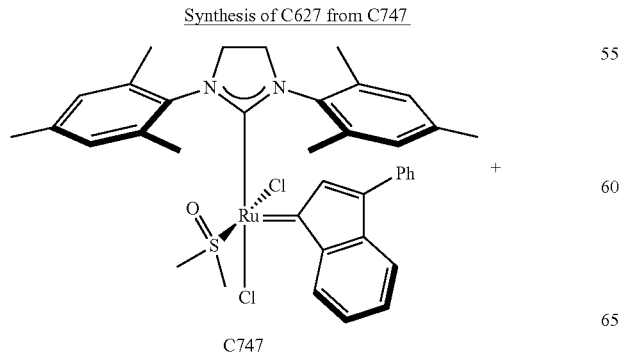

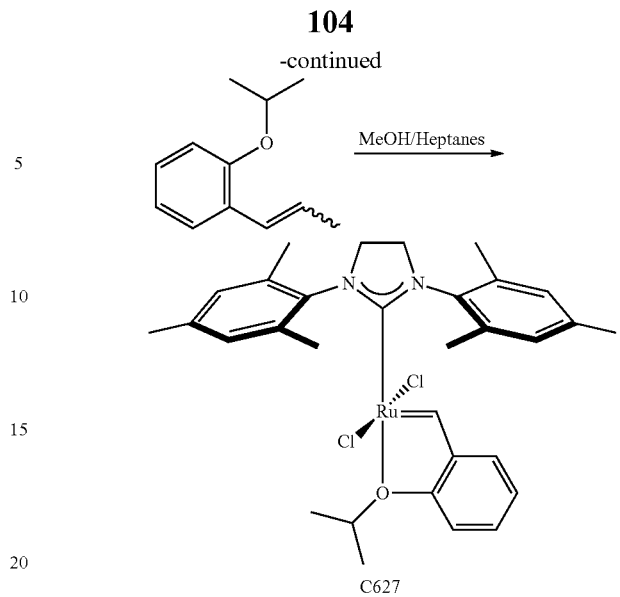

To a 20 mL scintillation vial equipped with a magnetic stir bar were added C747 (0.500 g, 0.670 mmol), 2-isopropoxy-P-methylstyrene (0.153 g, 0.870 mmol), heptanes (5 mL), and methanol (1 mL). The reaction was stirred at 60° C. for two hours then cooled to ambient temperature. The resulting precipitate was isolated by filtration, washed with methanol (2×5 mL) then dried in vacuum to afford C627 as a green solid (0.332 g, 79.1% yield). The $^1$H NMR data correspond to the data found in the literature.

Example 16

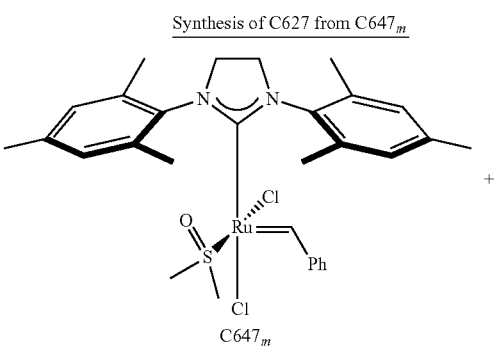

-continued

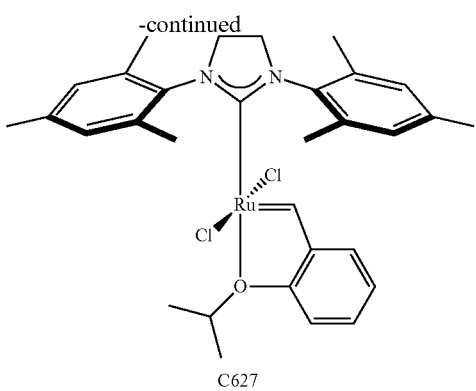

C627

To a 20 mL scintillation vial equipped with a magnetic stir bar were added C647$_m$ (0.400 g, 0.619 mmol), 2-isopropoxy-β-methylstyrene (0.142 g, 0.804 mmol), heptanes (5 mL), and methanol (1 mL). The reaction was stirred at 60° C. for one hour then cooled to ambient temperature. The resulting precipitate was isolated by filtration, washed with methanol (2×5 mL) then dried in vacuum to afford C627 as a green solid (0.228 g, 58.9% yield). The $^1$H NMR data correspond to the data found in the literature.

Example 17

Synthesis of C848 from C747

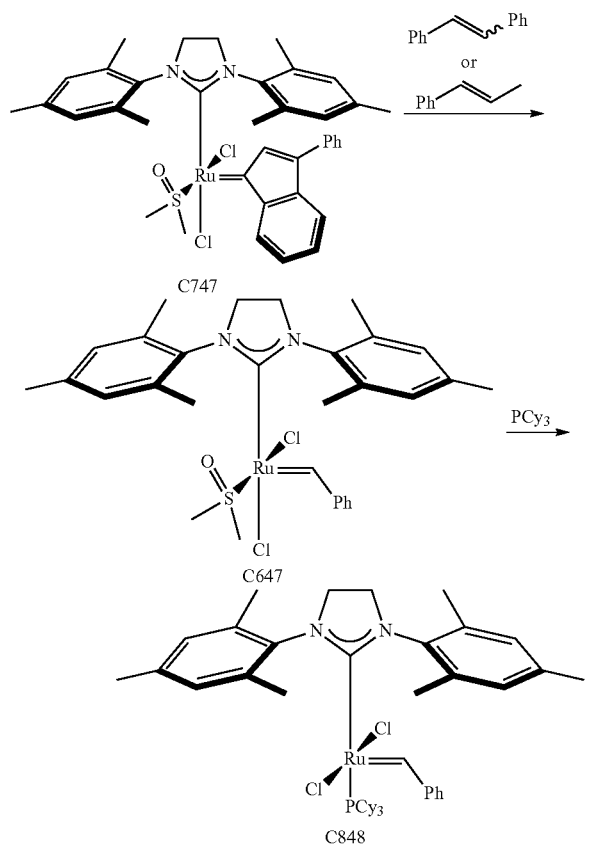

To a 20 mL scintillation vial was added C747 (0.300 g, 0.402 mmol), internal olefin [stilbene or β-methylstyrene]

(3.6-10 equiv), and halogenated solvent (chloroform or dichloromethane, 4 mL). Reactions were heated at 40 or 60° C. with stirring until <5% C747 remained as determined by $^1$H NMR spectroscopy (2 to 24 hours). PCy$_3$ (0.124 g, 0.442 mmol) was subsequently added and the reaction stirred for an additional 30 minutes. Yields of C848 ranged from 50-80% as judged by $^1$H and $^{31}$P NMR spectroscopy. The $^1$H NMR data correspond to the data found in the literature.

Catalytic Activity of the Olefin Metathesis
Catalysts of the Invention

Example 18

ROMP Reaction of DCPD-HT

The catalytic activity of the complexes according to the invention was evaluated in ROMP reactions as follows. A 250 mL beaker was filled with 100 g of DCPD-HT monomer and 50 ppm of CHP. The monomer was equilibrated to the desired temperature in an oil bath (30° C.+/−0.5° C.). A J-Type thermocouple was suspended directly into the center of the monomer. The catalyst under study was dissolved in solvent (either toluene or CH$_2$Cl$_2$) to form a catalyst solution and the catalyst solution was then added to the monomer at a molar ratio of 45,000:1 (monomer:catalyst) to form a ROMP composition. Addition of the catalyst to the monomer to form the ROMP composition denoted the start of the ROMP reaction and hence, this was time point zero. Temperature readings were recorded using the thermocouple. The exotherm time was determined by measuring the amount of time that passed (i.e., the time difference) between time point zero and the time point that a propagating interface of the ROMP composition was first visually observed as the ROMP composition transitioned from a liquid state or gel state to a cured polymer state. ROMP reactions were stopped 2 hours after addition of the catalyst solution to the monomer. Time to exotherm is expressed by: slow>120 minutes; moderate 30-120 minutes; medium 1-<30 minutes; fast<1 minute and peak exotherm temperature. The results are shown in Table (5).

TABLE 5

| Catalyst | DCPD-HT Monomer Temperature (° C.) | Peak Exotherm Temperature (° C.) | Time to Exotherm |
|---|---|---|---|
| C647$_m$ | 30 | 186 | medium |
| C861 | 30 | 190 | medium |
| C865 | 30 | 188 | medium |
| C773 | 30 | 188 | medium |
| C673 | 30 | 188 | medium |
| C625 | 30 | 190 | fast |
| C651 | 30 | 192 | moderate |
| C731 | 30 | 171 | slow |
| C591 | 30 | 167 | moderate |

Example 19

RCM of Diethyl-2,2-diallylmalonate

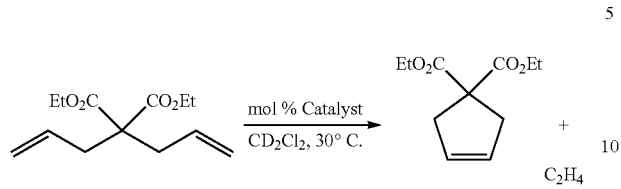

Figure 3:
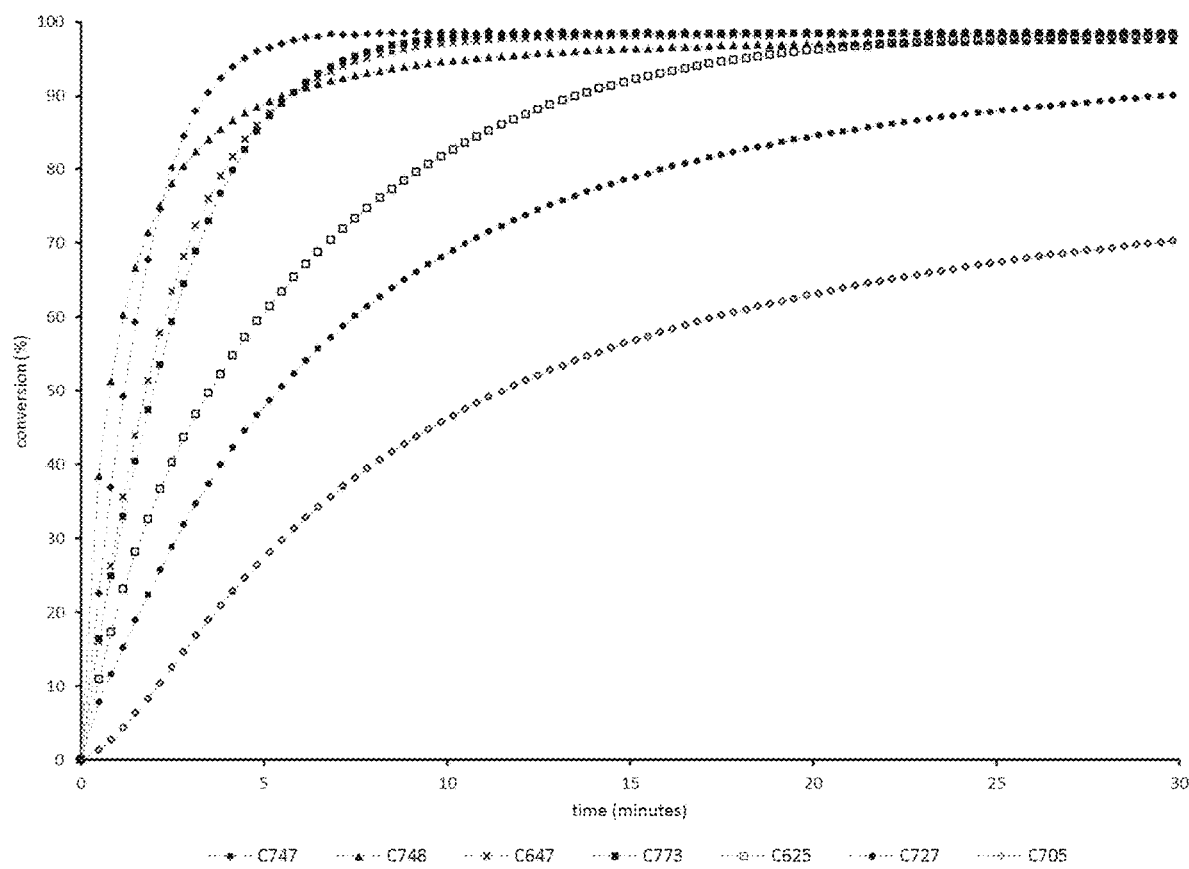
FIG. 3. Conversion of diethyl 2,2-diallylmalonate to 4,4-bis(ethoxy carbonyl)cyclo-pentene in the presence of an array of ruthenium catalysts.

Following the procedure outlined in *Organometallics*, 2006, 25, 5740-5745, inside an argon filled glovebox, a screwcap NMR tube fitted with a PTFE septum was charged with $CD_2Cl_2$ (0.75 mL or 0.775 mL) and catalyst stock solution (0.016 M, 50 μL, 0.80 μmol, 1.0 mol % or 0.016 M, 25 μL, 0.80 μmol, 0.5 mol %). Samples were equilibrated to 30° C. in a preheated NMR probe before diethyl 2,2-diallylmalonate (19.3 μL, 19.2 mg, 0.080 mmol, 0.1 M) was added via syringe. The ensuing reaction was monitored for 30 minutes using the Varian array function and the conversion to diethyl cyclopent-3-ene-1,1-dicarboxylate was determined by comparing the ratio of the integrals of the methylene protons in the starting material, δ 2.61 (dt), with those in the product, δ 2.98 (s). FIG. 3 shows the conversion of diethyl 2,2-diallylmalonate to 4,4-bis(ethoxy carbonyl)cyclopentene, wherein Catalyst is: C747, C748, C647, C773, C625, C727 or C705.

Example 20

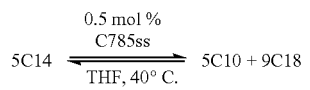

Self-metathesis of cis-5-Tetradecene (5C14)

In an argon filled glovebox, a 4 mL scintillation vial equipped with a magnetic stir bar was charged with C785$_{ss}$ (0.0046 g, 0.0059 mmol) and tetrahydrofuran (0.5 mL). cis-5-Tetradecene (0.150 mL total, 0.588 mmol) was subsequently added, the vial was sealed and stirred at 40° C. The reaction was sampled at appropriate time intervals and yields/stereoselectivies were determined by gas chromatography (Method 1) as shown in Table (6).

TABLE 6

| time (h) | 5C14 yield (%) | 5C10 yield (%) | 9C18 yield (%) | 9C18 (Z/E) |
|---|---|---|---|---|
| 1 | 50 | 24 | 25 | 93/7 |
| 2 | 50 | 24 | 24 | 92/8 |

What is claimed is:

1. An olefin metathesis catalyst of Formula (V),

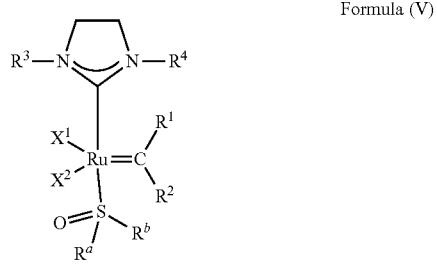

Formula (V)

$R^1$ and $R^2$ are linked together to form 3-phenylinden-1-ylidene;

$R^3$ is 2,4,6-trimethylphenyl, 2,6-di-iso-propylphenyl, or 2-iso-propyl-6-methyl phenyl;

$R^4$ is 2,4,6-trimethylphenyl, 2,6-di-iso-propylphenyl, or 2-iso-propyl-6-methyl phenyl;

$X^1$ and $X^2$ are independently Cl;

$R^a$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl;

$R^b$ is unsubstituted $C_1$-$C_{10}$ alkyl, substituted $C_1$-$C_{10}$ alkyl, unsubstituted $C_3$-$C_{10}$ cycloalkyl, substituted $C_3$-$C_{10}$ cycloalkyl, unsubstituted $C_5$-$C_{24}$ aryl or substituted $C_5$-$C_{24}$ aryl; or $R^a$ and $R^b$ are linked together to form a five or a six heterocyclic membered ring with the sulfoxide group.

2. The olefin metathesis catalyst of claim 1, wherein $R^a$ and $R^b$ are linked together to form a five or a six heterocyclic membered ring with the sulfoxide group.

3. The olefin metathesis catalyst of claim 1, wherein the catalyst is

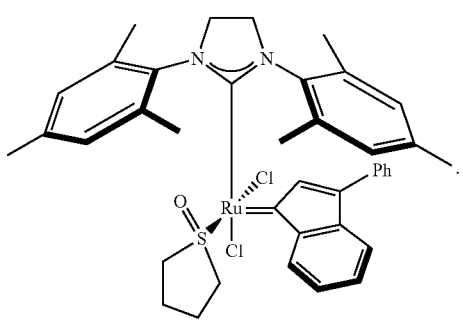

* * * * *